(12) United States Patent
He et al.

(10) Patent No.: US 11,880,344 B2
(45) Date of Patent: Jan. 23, 2024

(54) SYNTHESIZING MULTI-OPERATOR DATA TRANSFORMATION PIPELINES

(71) Applicant: Microsoft Technology Licensing, LLC, Redmond, WA (US)

(72) Inventors: Yeye He, Redmond, WA (US); Surajit Chaudhuri, Kirkland, WA (US); Junwen Yang, Chicago, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 96 days.

(21) Appl. No.: 17/321,138

(22) Filed: May 14, 2021

(65) Prior Publication Data

US 2022/0365910 A1    Nov. 17, 2022

(51) Int. Cl.
*G06F 16/21* (2019.01)
*G06N 20/00* (2019.01)

(52) U.S. Cl.
CPC ........... *G06F 16/211* (2019.01); *G06N 20/00* (2019.01)

(58) Field of Classification Search
CPC .............................. G06F 16/211; G06N 20/00
USPC ......................................................... 707/756
See application file for complete search history.

(56) References Cited

U.S. PATENT DOCUMENTS

| | | | | |
|---|---|---|---|---|
| 10,459,939 | B1* | 10/2019 | Agnew | G06T 11/206 |
| 2015/0081618 | A1* | 3/2015 | Schuster | G06F 16/254 |
| | | | | 707/602 |
| 2015/0100542 | A1* | 4/2015 | Li | G06F 16/254 |
| | | | | 707/602 |
| 2018/0150528 | A1* | 5/2018 | Shah | G06F 16/254 |
| 2019/0130007 | A1* | 5/2019 | Hao | G06F 17/18 |

FOREIGN PATENT DOCUMENTS

EP    3722968 A1    10/2020

OTHER PUBLICATIONS

"International Search Report and Written Opinion Issued in PCT Application No. PCT/US22/025858", dated Aug. 2, 2022, 14 Pages.
"Scythe: Synthesizing SQL Queries from Input Output Examples", Retrieved from: https://github.com/Mestway/Scythe, Retrieved Date: Nov. 9, 2020, 2 Pages.
"Jupyter", Retrieved from: https://web.archive.org/web/20210427165733/https://jupyter.org/, Retrieved Date: Apr. 27, 2021, 6 Pages.
"Microsoft Azure Data Factory", Retrieved from: https://azure.microsoft.com/en-us/services/data-factory/, Retrieved Date: Apr. 21, 2021, 15 Pages.

(Continued)

*Primary Examiner* — Hosain T Alam
*Assistant Examiner* — Saba Ahmed
(74) *Attorney, Agent, or Firm* — Newport IP, LLC; Jacob P. Rohwer

(57) ABSTRACT

Methods and systems for generating multi-operator data transformation pipelines. An example method includes accessing raw data for transformation; receiving a selection of a target table or target visualization, wherein the target table or target visualization is for data other than the raw data; extracting table properties and target constraints; and based on the extracted table properties and target constraints, synthesizing one or more multi-operator data transformation pipelines for transforming the raw data to a generated table or generated visualization.

20 Claims, 12 Drawing Sheets

(56) References Cited

OTHER PUBLICATIONS

"Create a Data-Driven Culture with Business Intelligence for All", Retrieved from: http://web.archive.org/web/20210224234741/https://powerbi.microsoft.com/en-us/?legRedir=true&CorrelationId=a93d3ea8-699c-457b-8249-421fb06d1603, Retrieved Date: Feb. 24, 2021, 11 Pages.
"Aggregate, Join, or Union Data", Retrieved from: http://web.archive.org/web/20210119152338/https://help.tableau.com/current/prep/en-us/prep_combine.htm, Retrieved Date: Jan. 19, 2021, 18 Pages.
Gu, et al., "SQL Server Integration Services", Retrieved from: https://docs.microsoft.com/en-us/sql/integration-services/sql-server-integration-services, Jul. 6, 2018, 2 Pages.
Cofsky, Amanda, "Power BI Desktop June Feature Summary", Retrieved from: https://powerbi.microsoft.com/en-us/blog/power-bi-desktop-june-feature-summary/#addColumn, Jun. 12, 2017, 25 Pages.
Abedjan, et al., "DataXFormer: A Robust Transformation Discovery System", In Proceedings of the IEEE 32nd International Conference on Data Engineering, May 16, 2016, 12 Pages.
Barowy, et al., "FlashRelate: Extracting Relational Data from Semi-Structured Spreadsheets using Examples", In ACM SIGPLAN Notices 50, Issue 6, Jun. 13, 2015, pp. 218-228.
Buranosky, et al., "FDTool: A Python Application to Mine for Functional Dependencies and Candidate Keys in Tabular Data", In F1000Research 7, Oct. 19, 2018, 16 Pages.
Yan, et al., "Auto-Suggest: Learning-to-Recommend Data Preparation Steps Using Data Science Notebooks", In Proceedings of the ACM SIGMOD International Conference on Management of Data, Jun. 14, 2020, pp. 1539-1554.
Deng, et al., "The Data Civilizer System", In Proceedings of the 8th Biennial Conference on Innovative Data Systems Research, Jan. 8, 2017, 7 Pages.
Doshi, Anish, "Transform by Example: Your Data Cleaning Wish is Our Command", Retrieved from: https://www.trifacta.com/blog/transform-by-example-your-data-cleaning-wish-is-our-command/, Jun. 18, 2019, 8 Pages.
Ellis, et al., "Unsupervised Learning by Program Synthesis", In Journal of Advances in Neural Information Processing System 28, Dec. 2015, 9 Pages.
Wang, et al., "Synthesizing Highly Expressive SQL Queries from Input-Output Examples", In Proceedings of the 38th ACM SIGPLAN Conference on Programming Language Design and Implementation, Jun. 18, 2017, pp. 452-466.
Gulwani, Sumit, "Automating String Processing in Spreadsheets Using Input-Output Examples", In ACM Sigplan Notices 46, Issue 1, Jan. 26, 2011, pp. 317-330.
Harris, et al., "Spreadsheet Table Transformations from Examples", In Proceedings of ACM SIGPLAN Notices, Jun. 4, 2011, pp. 317-328.
He, et al., "Transform-Data-by-Example (TDE): Extensible Data Transformation in Excel", In Proceedings of the International Conference on Management of Data, Jun. 10, 2018, pp. 1785-1788.
He, et al., "Transform-Data-By-Example (TDE): An Extensible Search Engine for Data Transformations", In Proceedings of the VLDB Endowment, vol. 11, Issue 10, Jun. 1, 2018, pp. 1165-1177.
Heer, et al., "Predictive Interaction for Data Transformation", In Proceedings of the 7th Biennial Conference on Innovative Data Systems Research, Jan. 4, 2015, 7 pages.
Jin, et al., "Auto-Transform: Learning-to-Transform by Patterns", In Proceedings of the VLDB Endowment, vol. 13, Issue 11, Jul. 1, 2020, pp. 2368-2381.
Jin, et al., "CLX: Towards Verifiable PBE Data Transformation", In Repository of arXiv:1803.00701v3, Oct. 13, 2018, 16 Pages.
Jin, et al., "Foofah: Transforming Data by Example", In Proceedings of the ACM International Conference on Management of Data, May 14, 2017, pp. 683-698.
Lehmberg, et al., "The Mannheim Search Join Engine", In Journal of Web Semantics, vol. 35, Part 3, Jan. 30, 2015, 11 Pages.
Lin, Long-Ji, "Reinforcement Learning for Robots using Neural Networks", In Ph.D. Dissertation of Doctor of Philosophy, Jan. 6, 1993, 168 Pages.
Manning, et al., "An Introduction to Information Retrieval", Published by Cambridge University Press, Apr. 1, 2009, 581 Pages.
Mcnamara, David, "Joins in Trifacta: Making Data Blending Faster & Easier", Retrieved from: https://www.trifacta.com/blog/making-data-blending-faster-easier/, Feb. 1, 2019, 10 Pages.
Mnih, et al., "Playing Atari with Deep Reinforcement Learning", In Repository of arXiv:1312.5602v1, Dec. 19, 2013, 9 Pages.
Oppenheimer, Diego, "Flash Fill", Retrieved from: https://www.microsoft.com/en-us/microsoft-365/blog/2012/08/09/flash-fill/, Aug. 9, 2012, 12 Pages.
Zhu, et al., "Auto-Join: Joining Tables by Leveraging Transformations", In Proceedings of the VLDB Endowment, vol. 10, Issue 10, Jun. 1, 2017, pp. 1034-1045.
Papenbrock, et al., "Functional Dependency Discovery: An Experimental Evaluation of Seven Algorithms", In Proceedings of the VLDB Endowment, vol. 8, Issue 10, Jun. 1, 2015, pp. 1082-1093.
Rahm, et al., "A Survey of Approaches to Automatic Schema Matching", In the International Journal on Very Large Data Bases, vol. 10 Issue 4, Dec. 2001, pp. 334-350.
Sarma, et al., "Synthesizing View Definitions from Data", In Proceedings of the 13th ACM International Conference on Database Theory, Mar. 22, 2010, pp. 89-103.
Silver, et al., "Mastering the Game of Go without Human Knowledge", In Journal of Nature, vol. 550, Issue 7676, Oct. 19, 2017, pp. 354-359.
Singh, Rishabh, "BlinkFill: Semi-Supervised Programming by Example for Syntactic String Transformations", In Proceedings of the VLDB Endowment, vol. 9, Issue 10, Jun. 1, 2016, pp. 816-827.
Sutton, et al., "Reinforcement Learning: An Introduction", In Publication of MIT Press, Jan. 1, 2018, 444 Pages.
Tran, et al., "Query by Output", In Proceedings of the ACM SIGMOD International Conference on Management of Data, Jun. 29, 2009, pp. 535-548.
Vashisth, et al., "Gartner: Market Guide for Self-Service Data Preparation", Retrieved from https://www.gartner.com/en/documents/3418832/market-guide-for-self-service-data-preparation, Aug. 25, 2016, 3 Pages.
Grunwald, Peter D., "The Minimum Description Length Principle", In Publication of MIT Press, Jan. 2007, 20 Pages.
"Pandas—Python Data Analysis Library", Retrieved from: http://web.archive.org/web/20210323023303/https://pandas.pydata.org/, Retrieved Date: Mar. 23, 2021, 1 Page.
"Alteryx", Retrieved from: https://web.archive.org/web/20210414093021/https://www.alteryx.com/, Retrieved Date: Apr. 14, 2021, 2 Pages.
"Titanic—Machine Learning from Disaster", Retrieved from: https://www.kaggle.com/c/titanic, Retrieved Date: Mar. 14, 2021, 5 Page.
Ow, et al., "Filtered Beam Search in Scheduling", In the International Journal of Production Research, vol. 26, Issue 1, Jan. 1, 1988, pp. 35-62.
Dasu, et al., "Exploratory Data Mining and Data Cleaning", Preface, In Publication of John Wiley & Sons, May 9, 2003, 12 pgs.

\* cited by examiner

Algorithm 1 Synthesis: A meta-level synthesis algorithm

1: procedure Synthesis($T^{in}$, $T^{tgt}$, $O$)
2:     $depth \leftarrow 0$, $candidates \leftarrow \emptyset$
3:     $S_{depth} \leftarrow \{empty()\}$    ▷ #initialize an empty pipeline
4:     while $depth < maxDepth$ do
5:         $depth \leftarrow depth + 1$
6:         for each ($L \in S_{depth-1}$, $O \in O$) do
7:             $S_{depth} \leftarrow S_{depth} \cup AddOneStep(L, O)$
8:         $S_{depth} \leftarrow GetPromisingTopK(S_{depth}, T^{tgt})$
9:         $candidates \leftarrow candidates \cup VerifyCands(S_{depth}, T^{tgt})$
10:     return GetFinalTopK($candidates$)

FIG. 4B

Results on the GitHub benchmark

|                       | Accuracy | MRR   | Latency (seconds) |
|-----------------------|----------|-------|-------------------|
| AUTO-PIPELINE-SEARCH  | 76.6%    | 0.724 | 18                |
| AUTO-PIPELINE-SL      | 73.7%    | 0.583 | 20                |
| AUTO-PIPELINE-RL      | 76.9% | 0.738 | 21           |
| SQL-by-Example        | 14.7%    | 0.147 | 49                |

FIG. 6A

Results on the Commercial benchmark

|                       | Accuracy | MRR   | Latency (seconds) |
|-----------------------|----------|-------|-------------------|
| AUTO-PIPELINE-SEARCH  | 62.5%    | 0.593 | 13                |
| AUTO-PIPELINE-SL      | 68.8% | 0.583 | 14               |
| AUTO-PIPELINE-RL      | 68.8% | 0.645 | 14           |
| SQL-by-Example        | 19%      | 0.15  | 64                |

FIG. 6B

SYNTHESIZING MULTI-OPERATOR DATA TRANSFORMATION PIPELINES

BACKGROUND

Data preparation, sometimes also known as data wrangling, refers to the process of building sequences of table-manipulation steps (e.g., Transform, Join, Pivot, etc.) in order to prepare raw data into a form that is ready for downstream applications (e.g., business intelligence or machine learning). The end result from data preparation is often a workflow or data pipeline with a sequence of table-manipulation steps, which can be operationalized as recurring jobs in production.

Business analysts and data scientists spend a significant fraction of their time on data preparation tasks. A recent trend requiring less technical users to prepare data themselves has made the challenge even more significant. In the commercial world, one approach to pipeline building has been mostly manual (e.g., drag-and-drop to build ETL pipelines).

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for synthesizing multi-operator data transformation pipelines using a by-target synthesis paradigm to automate pipeline building. As the name implies, the multi-operator pipelines include multiple operators, such as table-reshaping operators (e.g., a join operator, a union operator, a groupby operator, etc.) and string transformation operators (e.g., a split operator, a sub string operator, a concatenate operator, etc.). The technology may access or receive raw data that is to be transformed into format matching, or substantially matching, a target table or target visualization. The target table or target visualization is a table or visualization that was previously generated on data other than the raw data to be transformed. A selection of the target visualization or target table may be received from a user. Table properties and/or constraints may be extracted from the target table or visualization, and one or more multi-operator data transformation pipelines may be synthesized for transforming the raw data to a generated table or generated visualization that substantially match the target table or target visualization.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4B illustrates an example synthesis algorithm.

FIGS. 6A and 6B illustrate example experimental results.

DETAILED DESCRIPTION

Figure 1:
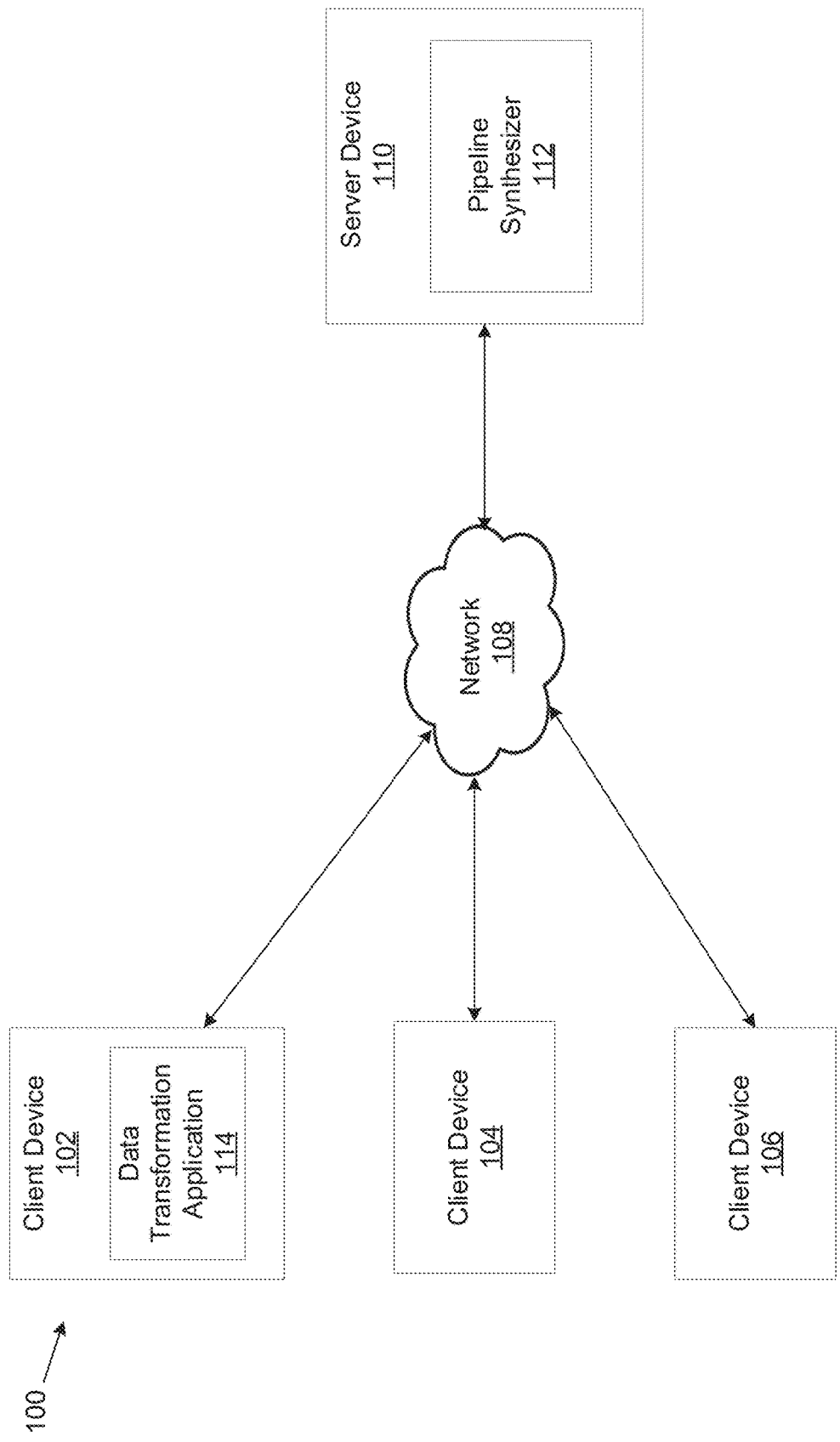
FIG. 1 schematically shows an example system for synthesizing multi-operator data transformation pipelines.

Data transformation can be extremely difficult, and transforming data from one form to another continues to present significant challenges. However, having data in the proper format is often required for proper analysis and operations to be performed on the data. The rise of machine learning has provided additional demand for improved data transformation systems. For instance, machine learning systems generally have strict requirements for the data to be in a uniform format in order to accurately process the data. As discussed above, data pipelines can be formed through the use of multiple operators that iteratively change the data from one format to another. Determining and building such pipelines is no small task as there are millions of combinations of operators that could be selected for data transformations.

To help address the data transformation problem, much of the focus has been on automating single data-prep steps (e.g., Transform, Join, etc.), but not much attention has been given to the more ambitious goal of automating multi-step pipeline-building end-to-end. One attempt to work towards that goal is a "by-example" paradigm (e.g., SQL-by-example and Query-by-output), which unfortunately requires a matching pair of input/output tables to be provided in order for the desired program (in SQL or otherwise) to be synthesized. While by-example is easy-to-use for row-to-row string transformation (because users only need to give 2-3 example values), for table-to-table transformations this paradigm would, unfortunately, require users to provide an entire output table, which is a significant overhead, and in many cases infeasible for users to provide (e.g., when complex aggregations on large tables are involved). Indeed, the "by-example" paradigm serves very little pragmatic utility as the final result (e.g., the transformed data) already had to be manually created by the user.

The present technology alleviates some of the problems discussed above and provides for automated methods and systems that create multi-operation data transformation pipelines without a user having to first manually create the desired result. This new paradigm for multi-step pipeline-synthesis is referred to as "by-target." Under the "by-target" paradigm, a user is able to use a "target" format for the data that is not based on the raw data the user is looking to transform. The target may be some other table or visualization that the user has identified and would like to transform raw data into a matching target format. For example, based on a selected target data table or data visualization, the present technology is able to extract table properties and constraints for the target. Based on the extracted table properties and target constraints, the present technology then synthesizes a multi-operator data transformation pipeline for transforming the raw data to a generated table or generated visualization that matches the target data. Accordingly, the "target" is easy for users to provide but still provides a sufficient specification for pipeline synthesis.

Multiple techniques may be used to generate the data pipelines from the selected target. For instance, constraint searching and/or machine learning process may be deployed to generate these multi-operator pipelines automatically. The search and learning-based synthesis algorithms have been shown to be effective on real data pipelines that enhance the server device's computing functions, streamline processing, reduce efforts, and eliminate redundant activities.

As an example use-case scenario, a common usage pattern in pipeline—is to onboard new data files, such as data from a new store/region/time-period, etc., that are often formatted differently. In such scenarios, users typically have a precise "target" in mind, such as an existing data-warehouse table, where the goal is to bring the new data into a form that "looks like" the existing target table (so that the new data can be integrated). Similarly, in building visualizations and dashboards for data analytics (e.g., in Tableau or Power BI), users can be inspired by an existing visualization and want to turn their raw data into a visualization that "looks like" the given target visualization (in which case we can target the underlying table of the visualization). With the present technology, the user is able to provide the existing visualization and raw data, and the technology automatically synthesizes a multi-operator data transformation pipeline to transform the rad data into the format of the existing visualization.

FIG. 1 illustrates an overview of an example system 100 for synthesizing pipelines using a by-target analysis of data elements. The system 100 may include a plurality of client devices 102-106 that are in communication with a server device 110. The communication between the client devices 102-106 and the server device 110 may occur via a network 108, which may be the Internet, a wide-area network (WAN), a local-area network (LAN), or other types of suitable networks.

One or more of the client devices 102-106 may include a data transformation application 114. The data transformation application 114 may perform some or all of the operations described herein. For example, the operations may be executed locally on a client device. The server device 110 may also include a pipeline synthesis application 114 or pipeline synthesizer 112. The pipeline synthesizer 112 synthesizes the multi-operator pipelines discussed herein. In some examples, the pipelines synthesizer 112 may perform some or all of the data transformation operations as well. The operations discussed herein may be performed by the data transformation application 114 and/or the pipeline synthesizer 112 such that processing operations may be shared between a client device 102 and a server device 110. The pipeline synthesis application 114 and/or pipelines synthesizer 112 may be components or portions of programming/code incorporated into bigger applications, such as various productivity or data analysis programs, such as the POWERBI application or Microsoft EXCEL.

The client devices 102-106 may be a source of raw data that is to be transformed. For instance, the client devices 102-106 may provide the raw data to the server device 110 is the pipeline synthesizer 112 is to also perform data transformation functions. In other examples, the raw data remains at the client devices 102-106 and the pipeline synthesizer generates the multi-operator pipeline and transmits those pipelines to the client devices 102-106 to allow for local transformation of the raw data based on the received multi-operator data transformation pipeline.

Figure 2:
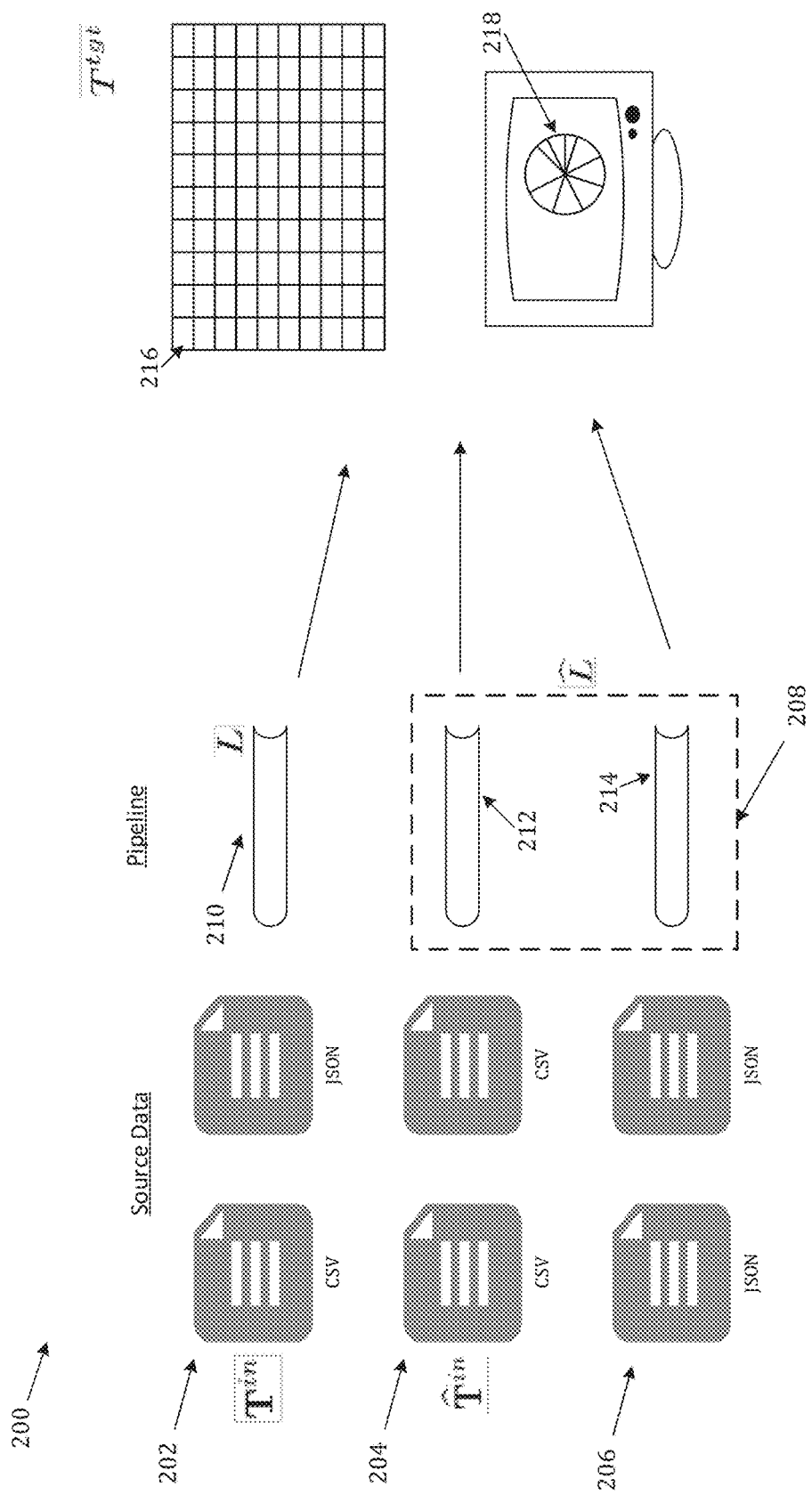
FIG. 2 illustrates an example of a pipeline-by-target system.

FIG. 2 illustrates an example of a pipeline-by-target system 200. The example system 200 includes a plurality of different raw data in the form of source files or source data, which are identified by a first source data 202, second source data 204, and third source data 206. The source data may include multiple different files that may have different formats and/or schemas. For example, as shown in FIG. 2, the source data may be in the form of .csv or .json files. The source data 202-206 is transformed by one of the corresponding pipelines 210-214 into target table 216 or a target visualization 218.

In the depicted example, the first source data 202 ($T^{in}$) is prior data for which a prior pipeline 210 (L) was previously generated (potentially manually or in some other manner) to create the target table 216 and/or target visualization 218 ($T^{tgt}$). The second source data 204 ($\hat{T}^{in}$) and the third source data 206, however, represent different data for which no pipelines have been previously created. Instead of building the pipelines for the new source data 204, 206 manually, the present technology automatically synthesizes a set of synthesized pipelines 208 ($\hat{L}$), that includes a first synthesized pipeline 212 and a second synthesized pipeline 214. The set of synthesized pipelines 208 are generated based on a selection of a target table or target visualization. For purposes of illustration, in this example, the selected target(s) include the target table 216 and/or the target visualization 218. In other examples, however, the selected target may be any existing table or visualization.

The synthesized pipeline(s) 212, 214 are generated based on characteristics extracted from the target table 216 and/or target visualization 218, such as table properties and constraints. Each of the synthesized pipelines 212, 214 include multiple operators, which may include table-reshaping operators and/or string transformation operators. The table reshaping operators may include operators such as a join operator, a union operator, a groupby operator, an agg operator, a pivot operator, an unpivot operator, or an explode operator. The string transformation operators may include operators such as a split operator, a substring operator, a concatenate operator, casing operator, or an index operator. When the new source data 204, 206 is provided as input into the respective synthesized pipeline 212, 214, a new table and/or visualization is generated that substantially matches the target table 216 and/or target visualization 218 (depending on whether the target table 216 and/or the target visualization 218 was selected as the target).

As a particular example of a use case for the example system 200, a large client may have data coming from numerous sources. Some version of the desired pipeline has been built previously, such as a legacy script/pipeline 210 from the client's internal IT that already produces a database table 216 or dashboard 218. However, as is often the case, new chunks of data for subsequent time periods or new stores need to be brought on-board, which may have different formats/schema (e.g., JSON vs. CSV, pivot-table vs. relational, missing/extra columns, etc.), because the new data comes from different systems or channels. Building a new pipeline manually for each such "chunk" (e.g., source data 204, 206) is laborious and especially challenging for less technical users who may not have the skills to build such pipelines from scratch. Today these less-technical users often have to submit a service ticket and wait until IT has the bandwidth to serve their needs.

With the present technology, multi-operator data transformation pipelines may be synthesized automatically in such a setting. For instance, users may point the system to a "target" that schematically demonstrates what the output should "look like." The user may provide an indication of the target in a variety of manners. For example, the user may provide the target by providing the system a location and/or a copy of the target table and/or visualization. In one example, a user may provide a particular type of a selection (e.g., right-click) on an existing database table and select the option to "append data to the table" or right-click an existing visualization and select "create a dashboard like this" to trigger pipeline synthesis operations described herein. From the perspective of the system, a selection of an existing table or visualization may be detected. In response to the selection, a menu of options is presented, including an option to use the table and/or visualization as a target for pipeline synthesis.

Unlike the "by-example" synthesis discussed above, the target used in this new "by-target" paradigm is only a fuzzy illustration of user intent. Surprisingly, this seemingly imprecise specification is often sufficient to determine the desired pipeline uniquely—the unique insight is that implicit constraints such as functional dependencies (FDs) and key properties discovered from the target table are often sufficient to constrain the space of possible pipelines. Such is a concept overlooked thus far by existing work on program-synthesis. This new by-target synthesis process becomes substantially more useful and practical because fuzzy "targets" are clearly much easier for a user to identify and provide than exact output tables based on the data the user is looking to transform.

The problem of synthesizing multi-step pipelines based on such a target, however, is challenging. The number of candidate pipelines grows exponentially in the number of steps, which is prohibitively large very quickly (reaching $10^{20}$ within five steps on typical tables). In order to make synthesis tractable, the end-to-end synthesis may be formulated as an optimization problem, and a search-based algorithm (which may be referred to herein as Auto-Pipeline-Search) may be utilized that considers a diverse array of factors to prioritize search over the most promising candidates best.

Additionally or alternatively, a deep reinforcement-learning ("DRL") based synthesis algorithm (which may be referred to herein as Auto-Pipeline-RL) may be utilized. The DRL model or algorithm "learns" to synthesize pipelines using large collections of real pipelines. In the DRL algorithm, the agent is rewarded when it successfully synthesizes a real pipeline by target, which is analogous to "self-play" in training game-playing agents such as AlphaGo and Atari. The RL-based synthesis is able to learn to synthesize fairly quickly and, in some examples, may outperform Auto-Pipeline-Search. A discussion of the data transformation problem (with reference to FIG. 2) is provided below, followed by a specific example application (e.g., the Titanic problem with reference to FIG. 3), which is then followed by a discussion of the Auto-Pipeline-Search algorithm and the Auto-Pipeline-RL algorithm.

Using FIG. 2 as a diagram for a specific example of the pipeline synthesis problem, the target is an existing table 216 ($T^{tgt}$) (e.g., a database table or visualization dashboard), generated from a pipeline L on a previous batch of input tables $T^{in}=\{T1, T2, \ldots\}$, written as $(T^{tgt})=\hat{L}(T^{in})$.

As is often the case, new data files 204, 206, denoted by $\hat{T}^{in}=\{\hat{T}_1, \hat{T}_2, \ldots\}$, have similar content but may have different schema and representations (e.g., because they come from different sources, etc.). Users would want to bring $\hat{T}^{in}$ onboard, but L is no longer applicable and often also not accessible. For instance, the original pipeline cannot be accessed by the user, and even if the original pipeline L could be accessed, it would not be applicable to the new data 204, 206.

New pipelines 212, 214 can be automatically synthesized if users can point the system to the new input files $\hat{T}^{in}$ and the target $T_{tgt}$ to schematically demonstrate what output from the desired pipeline should "look like." This by-target synthesis problem may be defined as follows. In by-target pipeline-synthesis, given new input data $\hat{T}^{in}$, and a target table $T_{tgt}$ generated from related input $T_{in}$ that schematically demonstrates the desired output, the need to synthesize a pipeline L using a predefined set of operators O, such that $\hat{T}^{o}=\hat{L}(\hat{T}^{in})$ produces the desired output.

Since a target-table $T_{tgt}$ only provides a fuzzy specification of the synthesis problem, the discussion continues here with how a by-target synthesis system can be systematically evaluated. In traditional by-example synthesis (e.g., SQL-by-example), a pair of matching input/output tables ($\hat{T}^{in}$, $\hat{T}^{o}$) is provided as input to synthesis algorithms (even though in practice $\hat{T}^{o}$ is hard to come by). In such a setting, evaluating a synthesized program $\hat{L}$ often reduces to a check of whether the synthesized output $\hat{L}(\hat{T}^{in})$ is the same as $\hat{T}^{o}$.

In by-target synthesis, an input pair of nonmatching tables is given ($\hat{T}^{in}$, $T_{tgt}$), for which the same evaluation of by-example does not apply. It turns out, however, that evaluation by-target synthesis can be performed similarly, using what is analogous to "testing"/"training" in machine learning ("ML").

Even though by-target synthesis can be systematically evaluated using a procedure analogous to train/test in ML, one may still wonder whether a nonmatching pair ($\hat{T}^{in}$, Ttgt) in by-target synthesis provides a sufficient specification for the desired pipeline to be synthesized. (In any event, for cases where by-target synthesis does not provide a sufficient specification such that desired pipelines cannot be found, all the failed cases would still be reflected in the evaluation above). This seemingly imprecise specification from $T_{tgt}$ is, in fact, sufficient in most cases by leveraging implicit constraints that can be discovered from $T_{tgt}$. This is illustrated using the following example from FIG. 3.

Figure 3:
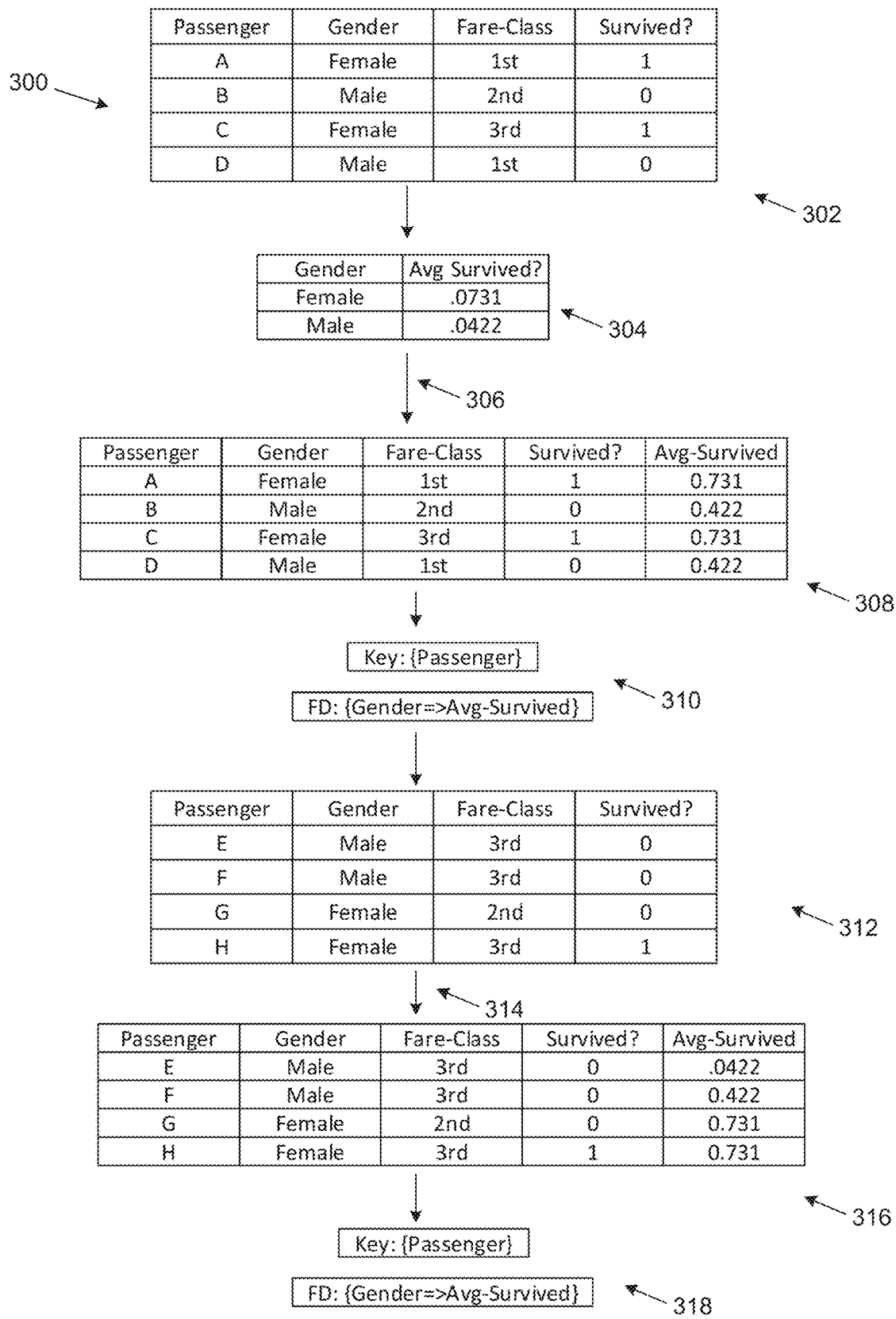
FIG. 3 illustrates a simplified example of a data pipeline process.

FIG. 3 shows a simplified example of a data pipeline process 300 based on data authored by data scientists on GitHub for the Titanic challenge on Kaggle. Titanic is a popular data science task, where the goal is to predict which passengers survived, using a combination of features (Gender, Fare-class, etc.) as shown in table 302. A common data-pipeline, in this case, may perform a GroupBy operator on the "Gender" column to compute "Avg-Survived" by "Gender" as shown in table 304. Subsequently, join operation may be performed on "Gender" to bring "Avg-Survived" as an additional feature back into the original input, like shown in target table 308. In some examples, the enhanced table 308 may then be fed into downstream ML to train models.

In the setting of by-target synthesis, a different user is now given a similar input table with a different set of passengers, as shown in table 312. Without having access to the original pipeline that was used to create the target table 308, the user points to table 308 as the target table to demonstrate his/her desired output for by-target synthesis to synthesize the desired pipeline.

The desired synthesized pipeline can be uniquely determined by leveraging implicit constraints discovered from the target table 308. As one example, standard constraint-discovery techniques may be applied to determined or uncover such implicit constraints. Such constraints may include functional dependencies (FDs) and/or key properties. Two example constraints for the target table 308 are shown in data 310, which include a first constraint of Key-column: {"Passenger"} and a second constraint of (FD): {"Gender"→"Avg-Survived"}.

When table 312 is used as the new input and target table 308 is used as the target, it is desired to generate a synthesized pipeline 314 to follow the same set of transformations in the pipeline that produced target table 308, and as such, the new output table 316 using table 312 as input should naturally satisfy the same set of constraints generated from target table 308. For instance, if a column mapping is performed between the target table 308 and new output table 316, it can be seen that the constraints discovered from these two tables, as shown in data 310 and data 318, have a direct one-to-one correspondence. Suppose it is needed to recreate these implicit constraints in table 308 in a synthesized pipeline. In that case, it can be shown that the only pipeline with the smallest number of steps to satisfy all these constraints is the aforementioned pipeline. Other pipelines may either miss one constraint or require more steps, which are less likely to be desired, according to MDL and Occam's Razor. In summary, a unique insight is that leveraging implicit constraints sufficiently constrains the by-target synthesis problem. The large-scale evaluation confirms that a large fraction of real pipelines can be successfully synthesized using such a new by-target paradigm. As discussed above, the synthesized multi-operator data transformation pipelines may be generated by using a search-based algorithm (e.g., Auto-Pipeline-Search) and/or a deep reinforcement-learning ("DRL") based synthesis algorithm (e.g., Auto-Pipeline-RL). Both algorithms are discussed below.

Figure 4A:
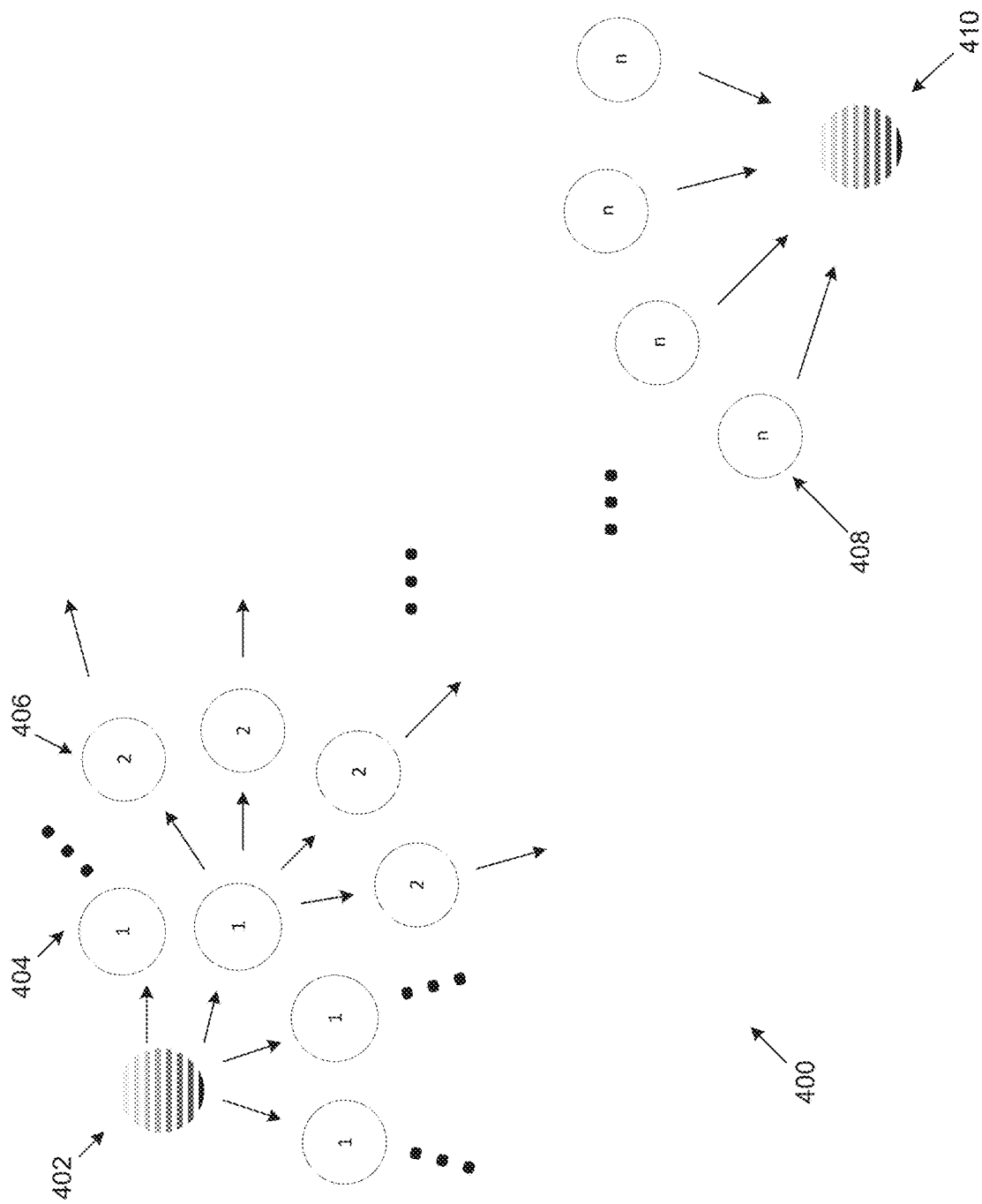
FIG. 4A illustrates an example of a search graph for synthesis.

FIG. 4A illustrates an example synthesis process 400 using a search graph. The search graph for synthesis includes a start node 402 (i.e., an empty pipeline) and an end node 410 (i.e., a synthesized pipeline). Each intermediate node (e.g., nodes between the start node 402 and the end node 410) represents an intermediate state in the synthesis process, which corresponds to a "partial pipeline." Multiple intermediate nodes are provided at different depths (D) of the graph. For instance, a first set of intermediate nodes 404 are represented at a first depth (D=1), a second set of intermediate nodes 406 are represented at a second depth (D=2), and a third set of intermediate nodes 408 are represented at a nth depth (D=n). Each edge represents the act of adding one operator, which leads to the new pipeline with one more operator.

The starting state/node 402 corresponds to an empty pipeline $\hat{L}=\{\ \}$, and the ending state 206 corresponds to a final synthesized pipeline $\hat{L}=\{O1, O2, \ldots On\}$. From each state representing a partial pipeline, the partial pipeline can be extended by one additional "step" using some operator O from the set of operators, which may include table-reshaping operators and/or string transformation operators. The table reshaping operators may include operators such as a join operator, a union operator, a groupby operator, an agg operator, a pivot operator, an unpivot operator, or an explode operator. The string transformation operators may include operators such as a split operator, a sub string operator, a concatenate operator, casing operator, or an index operator.

For example, from the starting state $\hat{L}=\{\ \}$, different instantiations of operators in O (e.g., different ways to apply GroupBy/Join/Pivot, etc., on given input tables) may be added, which lead to different one-step pipelines (e.g., $\hat{L}=\{GroupBy(table-1, column-1)\}$). For example, an intermediate node has a number of operators corresponding to its respective depth. As an example, a partial pipeline for a node in first set of intermediate nodes 404 has one operator and may be referred to as a single-operator partial pipeline. A partial pipeline for a node in the second set of intermediate nodes 406 has two operators and may be referred to as a double-operator partial pipeline. This synthesis process can be visualized as traversing the pipeline-state search graph until a satisfactory end-state can be reached (e.g., satisfying all implicit constraints).

As can be seen from search graph, however, the search space of possible pipelines is prohibitively large, because (1) the number of possible pipelines grows exponentially with the number of pipeline steps; and (2) even one individual step can be instantiated/parameterized in numerous ways—e.g., a Join between two tables with |C| columns each can in theory use any of the $|C|2$ column-pairs as the Join key. The same is true for parameterizing GroupBy, etc.

With respect to challenge (2), for each operator (e.g., Join), existing processes to accurately predict the most likely way to parameterize the operator (e.g., given input tables, which columns will likely Join/Group-By/Pivot etc.) may be used. Conceptually, for each operator $O \in \mathbb{O}$ and given input tables T, it is needed to predict the likelihood of using parameter p for O in the context of T, written as $PT(O(p))$. For instance, for a Join between two given tables, the characteristics of the tables may be considered to estimate which columns will likely join (e.g., a Join parameter); similarly, for Unpivot, input tables are considered and a prediction of which subset of columns should Unpivot (also a parameter), etc. is determined.

For this reason, a prior technique that may be leveraged is called Auto-Suggest, which is described in the following paper: Cong Yan and Yeye He. 2020. Auto-Suggest: Learning-to-Recommend Data Preparation Steps Using Data Science Notebooks. In Proceedings of the 2020 ACM SIGMOD International Conference on Management of Data. 1539-1554, which is incorporated herein by reference in its entirety. Auto-Suggest learns from real data pipelines to predict the likelihood of using parameters p for each operator O given input tables T, which is precisely $PT(O(p))$. In the present technology, Auto-Suggest may be leveraged and treats these $PT(O(p))$ as given so that the system can better focus on the end-to-end pipeline synthesis problem. Auto-Suggest contains details of these single-operator predictions in the interest of space.

Given the probabilistic estimates of operator parameters $P(O(p))$, and the fact that the system wants to synthesize a pipeline that can satisfy all implicit constraints (FD/Key), the synthesis may be formulated as an optimization problem. Specifically, it is desired to find the "most likely" pipeline $\hat{L}$ consisting of a sequence of suitably parameterized operators $\hat{L}=\{O1(p1), O2(p2), \ldots\}4$, by maximizing the joint probabilities of these operators Oi (pi), under the constraints that output from $\hat{L}$ should satisfy all implicit constraints. This problem, henceforth referred to as PMPS (probability-maximizing pipeline synthesis), can be written as the following Equations (1)-(4):

(PMPS) arg max $\hat{L}$ $$\Pi_{O_i(p_i) \in \hat{L}} P(O_i)(p_i) \quad (1)$$

$$s.t.\ FD(\hat{L}(T^{in}))=FD(T^{tgt}) \quad (2)$$

$$Key(\hat{L}(T^{in}))=Key(T^{tgt}) \quad (3)$$

$$Col\text{-}Map((\hat{L}(T^{in}),T^{tgt}) \quad (4)$$

The objective function in Equation (1) states the goal is to find the most likely pipeline $\hat{L}$, or the one whose joint probability of all single-step operator invocations is maximized. Equations (2) and (3) state that when running the synthesized pipeline $\hat{L}$ on the given input $\hat{T}^{in}$ to get $\hat{L}(\hat{T}^{in})$, the FD/Key constraints discovered from $T^{tgt}$ should also be satisfied on $\hat{L}(\hat{T}^{in})$. Finally, Equation (4) states that columns should "map" from $\hat{L}(\hat{T}^{in})$ to $T^{tgt}$, with standard schema mapping.

In revisiting FIG. 3 using the "Titanic" example, using Auto-Suggest, it is estimated that the probabilities $P(O(p))$ of the two steps in the pipeline (GroupBy and Join) to be 0.4 and 0.8, respectively. Among all other possible pipelines, this two-step pipeline maximizes the joint probability (0.32) in Equation (1), while satisfying all FD/Key/column-mapping constraints in Equation (2)-(4), and thus results in the solution to PMPS.

Returning to FIG. 4A, the synthesis process can be seen as traversing the large search graph, as briefly discussed above. Because each intermediate node (e.g., a node in a node set 404, 406, 408) corresponds to a partial pipeline, and each edge corresponds to the act of adding one operator, each node that is depth-steps away from the start-node 402 naturally corresponds to a partial pipeline with depth number of operators/steps.

Given the large search graph, it is most efficient to explore only "promising" parts of the graph. One example of such a strategy is a metalevel synthesis algorithm shown in Algorithm 1 shown in FIG. 4B, which uses a form of beam search. As should be appreciated, Algorithm 1 is only one example of performing such a search to generate pipelines, and other examples and algorithms may be utilized.

Algorithm 1 starts by initializing depth=0 to indicate that the system is at the start-node 402 in FIG. 4A. The variable candidates stores all "valid" pipelines satisfying the constraints in PMPS (Equations (2)-(4)) and is initialized as an empty set. The variable $S_{depth}$ corresponds to all pipelines with depth-steps that are actively explored in one loop iteration, and at line 3, a single placeholder empty-pipeline is initialized because it is the only 0-step pipeline, and it is still at the start-node 402 of the search graph.

From line 4, nodes are visited iteratively that are depth={1, 2, . . . } steps away from the start-node, which is equivalent to exploring all pipelines with {1, 2, . . . } operators. As the increment depth in the loop is incremented, all active pipelines take from the previous iteration with (depth−1) steps, denoted by $S_{depth-1}$, and "extend" each partial pipeline L∈Sdepth−1 using one additional operator O∈O, by invoking AddOneStep(L,O), which is shown at line 7. These resulting pipelines with depth-steps are saved as $S_{depth}$. To improve efficiency of the search (by not requiring the system to exhaustively explore all pipelines in $S_{depth}$), at line 8, top-K (e.g., the Top K number of partial pipelines) is selected as the most promising partial pipelines from $S_{depth}$ by invoking GetPromisingTopK( ). Top-K is then checked by the promising pipelines using VerifyCand( ), and the partial pipelines that satisfy PMPS constraints as candidates (line 9) are marked, which is the end of one iteration.

The loop continues and goes back to line 4, where it is incremented depth by one and explores longer pipelines until enough valid candidates are found or reached the maximum depth. At that point, algorithm returns the final top-K candidate pipelines by invoking GetFinalTopK( ) (line 10).

While the primary steps in the synthesis process are sketched out in Algorithm 1, a few sub-routines have yet to be fully described: AddOneStep( ) extends a partial pipeline L using one additional operator O∈O; VerifyCands( ) checks whether pipelines satisfy PMPS constraints and if so marks them as final candidates; GetPromisingTopK( ) selects the most promising top-K pipelines from all explored pipelines with depth-steps; GetFinalTopK( ) reranks and returns final pipelines.

The first two sub-routines, AddOneStep( ) and VerifyCands( ) are reasonably straightforward—AddOneStep( ) adds one additional step into partial pipelines by leveraging Auto-Suggest to find the most likely parameters for each operator, while VerifyCands( ) checks for PMPS constraint using standard FD/key-discovery and column-mapping. The last two sub-routines, GetPromisingTopK( ) and GetFinalTopK( ) help ensure that efficient searching of promising parts of the graph occurs and that pipelines can synthesize successfully.

The AddOneStep( ) subroutine is discussed in further below. AddOneStep(L,O) takes as input a depth-step partial pipeline L={$O_1(p_1)$, . . . , $O_{depth}(p_{depth})$}, and some operator O (enumerated from all possible operators O) that is to be added into L. Auto-Suggest is leveraged, which considers the characteristics of intermediate tables in the partial pipeline L, to predict the best parameter p=arg max p∈p P(O (p)|L) to use. The predicted parameter p is used to instantiate the new operator O, and the resulting O(p) is used to extend L by one additional step, producing L'={$O_1(p_1)$, . . . $O_{depth}$ ($p_{depth}$),O(p)}.

Note that in general, for each operator O, there may be more than one good way to parameterize O (e.g., there may be more than one plausible GroupBy columns, or more than one good Join column, etc.). So instead of using only top-1 predicted parameter, for each O a set of top-M number of parameterized operators is kept as the most likely parameters, which may produce M possible pipelines after invoking AddOneStep(L,O) for a given L and O.

The following example illustrates the process where the Titanic example in FIG. 3 is revisited. At initial step, one input table is received, and an empty pipeline L={ } is generated or initiated. All possible operators O∈O to extend L are enumerated (e.g., all possible operators for intermediate nodes 404 in FIG. 4A).

Suppose the first pick of O is to be the GroupBy operator. Intuitively, Gender and Fare-Class columns can be seen as the most likely used for GroupBy (because these two columns have categorical values with low cardinality). The single-operator predictors from Auto-Suggest—in this case, the GroupBy predictor is leveraged, which may predict that P(GroupBy(Fare-Class)|L)=0.5 and P(GroupBy (Gender)|L)=0.4 to be the most likely. If M=2 (e.g., keep top-2 parameters) for each operator is used, this leads to two new 1-step pipelines L' 1={GroupBy(Fare-Class)} and L'2={GroupBy(Gender)}.

The same process continues for other operators in the set of operators. For instance when O is picked to be "Pivot," it may be predicted that Gender and Fare-Class to be likely Pivot keys, so L'3={Pivot (Gender)}, L'4={Pivot (Fare-Class)} is received.

However, when O is selected to be Join/Union, the probabilities of all possible parameters are 0 because no instantiation is valid with only one input table in L. Such would change when more than one intermediate table later is obtained—e.g., in a subsequent step to generate table 304 in FIG. 3, a new intermediate table is generated from GroupBy. Using Auto-Suggest, a Join using Gender may be predicted to be likely, while a Union is unlikely because of the difference in schema between the two tables.

The VerifyCands( ) sub-routine is now described in further detail below. Recall that VerifyCands($S_{depth}, T_{tgt}$) takes as input a collection of pipelines $S_{depth}$ (the set of synthesized pipelines with depth steps), and check if an $\hat{L} \in S_{depth}$ satisfy all constraints listed in Equations (2)-(4) for Key/FD/column-mapping, in relation to the target table $T_{tgt}$.

For column mapping, standard schema mapping techniques may be applied to find possible column mapping between the target table $T_{tgt}$, and the output table from a synthesized pipeline $\hat{L}(T^{in})$, using a combination of signals from column names and column-values/patterns. Some example schema mapping techniques are described in the following paper: Erhard Rahm and Philip A Bernstein. 2001. A survey of approaches to automatic schema matching. *the VLDB Journal* 10, 4 (2001), 334-350. The details of this step are provided in an example below for illustration.

Consider a synthesized pipeline $\hat{L}$ that produces an output table 316 of FIG. 3. Recall that the target in that example is target table 308 $T_{tgt}$—for a synthesized $\hat{L}$ to be successful, its output $\hat{L}(\hat{T}^{in})$ should "cover" all columns in the target $T_{tgt}$, as required in Equation (4). As such, a column mapping between table 308 and table 316 may be generated or established.

Using standard schema-mapping techniques, column-to-column mapping as shown in FIG. 3 may be generated using a combination of signals from column-values, column-patterns, and column-names. This synthesized pipeline $\hat{L}$ thus satisfies the column-mapping constraint in Equation (4).

For FD/Key constraints, we again apply constraint discovery techniques, to discover FD/Key constraints from both the target table $T_{tgt}$, and the output table $\hat{L}(\hat{T}^{in})$ from a synthesized pipeline $\hat{L}$, in order to see if all FD/Key constraints from $T_{tgt}$ can be satisfied by $\hat{L}$. Examples of constraint discovery techniques are discussed in the following two papers: (1) Matt Buranosky, Elmar Stellnberger, Emily Pfaff, David Diaz-Sanchez, and Cavin Ward-Caviness. 2018. FDTool: a Python application to mine for functional dependencies and candidate keys in tabular data. *F1000Research* 7 (2018); and (2) Thorsten Papenbrock, Jens Ehrlich, Jannik Marten, Tommy Neubert, Jan-Peer Rudolph, Martin Schonberg, Jakob Zwiener, and Felix Naumann. 2015. Functional dependency discovery: An experimental evaluation of seven algorithms. *Proceedings of the VLDB Endowment* 8, 10 (2015), 1082-1093. The below example is used to illustrate such example constraint discovery techniques.

Given a synthesized pipeline $\hat{L}$ that produces an output table 316 of FIG. 3, and a target table $T_{tgt}$ 308, constraint-discovery is applied to discover Key/FD constraints are shown in data 318 and data 310 for these two tables, respectively. Since column mapping is already established between the two tables, it can be seen that all Key/FD constraints from the target table 308 have been satisfied by table 316, suggesting that Equations (2) and (3) are satisfied. Given that Key/FD/column-mapping have all been satisfied for the output in table 316, in VerifyCands( ), the corresponding pipeline $\hat{L}$ can be marked as a feasible solution to PMPS (and saved in the variable candidate in Algorithm 1).

The sub-routines GetPromisingTopK( ) and GetFinalTopK( ) are now described. Recall that the goal is to solve the optimization problem PMPS, which requires a pipeline to be found that can (1) maximize overall joint operator probabilities in the synthesized pipeline (the objective function in Equation (1)), and (2) satisfy constraints in Equations (2)-(4).

Because each candidate pipeline has already been checked for constraint satisfaction (Equations (2)-(4)) in VerifyCands( ), GetFinalTopK( ) may require only picking candidate pipelines that maximize joint operator probabilities. That is, for a synthesized pipeline $\hat{L} = \{O_1(p_1), O_2(p_2), \ldots \}$, the joint operator probabilities can be calculated as $P(\hat{L}) = \Pi_{O_i(p_i) \in \hat{L}} P(O_i(p_i))$, where $P(O_i(p_i))$ are estimated from single-operator models in Auto-Suggest. A ranked list of top-K pipelines may then be generated by simply ranking all candidate pipelines using $P(\hat{L})$.

On the other hand, the sub-routine GetPromisingTopK( ) evaluates all depth-step pipelines currently explored. It is used to find top-K promising candidates to prune down the search space. GetPromisingTopK( ) may not use the same strategy as GetFinalTopK( ) by simply maximizing $P(\hat{L})$ because this may lead to pipelines that cannot satisfy PMPS constraints (Equations 2-(4)), resulting in infeasible solutions.

Because of that reason, a diversity-based strategy is designed in GetPromisingTopK( ) by picking not only partial pipelines that maximize the objective function in PMPS (Equation (1)), but also the ones that satisfy the most number of FD/key/column-mapping constraints in (Equations (2)-(4)). Specifically, given a budget of K promising partial pipelines that can be kept in $S_{depth}$, a balanced set of criteria is considered by selecting K/3 pipelines from each of the three groups below: (1) K/3 pipelines is selected that have the highest overall probabilities P(L); (2) K/3 pipelines is selected whose output tables satisfy the most number of FD/Key constraints in the target table; (3) K/3 pipelines is selected whose output tables can "map" the most number of columns in the target table. Such a process is demonstrated using the example below.

In working with FIG. 3, suppose a budget of K=3 pipelines to keep is utilized. Using the diversity-based search in GetPromisingTopK( ), one pipeline can be kept each based on (1) probabilities, (2) key/FD constraints, and (3) column mapping, respectively. For all one-step pipelines considered in Example 3, based on the criterion (1), it can be seen that the partial pipeline $L'_1 = \{GroupBy(Fare-Class)\}$ has the highest probability and is selected, while based on the criterion (2) the pipeline $\hat{L}'_2 = \{GroupBy(Gender)\}$ is selected as it satisfies an additional FD constraint found in the target table, etc.

Suppose that among all 1-step pipelines, the set $S_1 = \{L'_1, L'_2, L'_5\}$ is selected as promising partial pipelines in GetPromisingTopK( ) given a K=3. In the next iteration, when considering 2-step pipelines, the algorithm starts from S1 and considers different ways to extend pipelines in $S_1$ using AddOneStep( ). Extending $L'_2 \in S_1$ with a Join on Gender yields a high probability pipeline that satisfies all constraints, which becomes a solution to PMPS.

Note that the search is prioritized on a promising set of K=3 pipelines at each depth level without exploring all possible 1-step and 2-step pipelines in this example. Thus, the search is performed significantly more efficiently, and computing resources are conserved in performing the search to generate the synthesized pipeline.

In addition to the search-based synthesis, a learning-based synthesis may also be utilized, which follows substantially similar or same steps in Algorithm 1, except that the learning-based synthesis replaces the search-based heuristics in GetPromisingTopK and GetFinalTopK by using deep reinforcement learning (DRL) models.

At a high level, the pipeline synthesis problem may bear a resemblance to game-playing machine-learning systems such as AlphaGo (David Silver, Julian Schrittwieser, Karen Simonyan, Ioannis Antonoglou, Aja Huang, Arthur Guez, Thomas Hubert, Lucas Baker, Matthew Lai, Adrian Bolton, et al. 2017. Mastering the game of go without human knowledge. *nature* 550, 7676 (2017), 354-359) and Atari (Volodymyr Mnih, Koray Kavukcuoglu, David Silver, Alex Graves, Ioannis Antonoglou, Daan Wierstra, and Martin Riedmiller. 2013. Playing atari with deep reinforcement learning. arXiv preprint arXiv:1312.5602 (2013)).

Recall that in learning-to-play games such as Go and Atari, agents need to take into account game "states" they are in (e.g., visual representations of game screens in Atari games or board states in the Go game), in order to produce suitable "actions" (e.g., pressing up/down/left/right/fire buttons in Atari, or placing a stone on the board in Go) that are estimated to have the highest "value" (producing the highest likelihood of winning).

In the case of pipeline synthesis, the problem may have a similar structure. Specifically, like illustrated in FIG. 4A, at a given "state" in the search graph 400 (representing a partial pipeline L), a decision of suitable next "actions" to take needs to be determined—e.g., among all possible ways to extend L using different operators/parameters, which ones have the highest estimated "value" (providing the best chance to synthesize successfully).

Similar to how game-playing agents can be trained via "self-play", or by playing many episodes of games with win/loss outcomes to learn optimized "policies" for games (what actions to take in which states), in the present pipeline synthesis an optimized synthesis "policy" may also be learned via "self-synthesis." For instance, the pipeline synthesis may feed a reinforcement learning (RL) agent with large numbers of real data pipelines, asking the agent to synthesize pipelines by itself and rewarding it when successful.

Given this intuition, the search-based heuristics in GetPromisingTopK and GetFinalTopK may be replaced using a particular form of reinforcement learning called Deep Q-Network (DQN) described in the Atari paper noted above. DQN which uses a deep neural network to directly estimate the "value" of a "state", or intuitively how promising a partial pipeline is that may ultimately lead to a successfully synthesis. Other types of machine learning models may also be utilized.

More formally, such as in Markov Decision Process (MDP), there is a space of states S where each state $s \in S$ corresponds to a pipeline $L(s)=\{O_1(p_1), O_2(p_2), \ldots, O_s(p_s)\}$, which in turn corresponds to a node in the search graph in FIG. 3. From each state $s \in S$, it can take action $a \in A$, which adds a parameterized operator to the pipeline L(s) and leads to a new state s' corresponding to the pipeline $L(s')=\{O_1(p_1), O_2(p_2), \ldots, O_s(p_s), O_a(p_a)\}$. Unlike MDP, state transition in the problem is deterministic because adding $O_a(p_a)$ to pipeline L(s) uniquely determines a new pipeline.

The challenge in the pipeline-synthesis problem, however, is that the state/action space of one data pipeline is different from another data pipeline. For example, the action of adding an operator "Join(Gender)" in the pipeline of FIG. 3 does not apply to other pipelines operating on different input tables. This calls for a way to better "represent" the states and actions so that learned synthesis policies can generalize across pipelines.

Because of this reason, Deep Q-Network (DQN) may be used to directly learn the value-function of each state s, denoted as Q(s), which estimates the "value" of a state s, or how "promising" s is in terms of successful synthesis. In order to represent states S of different pipelines in a manner that generalizes across different pipelines and tables, a representation is needed that abstracts away the specifics of each pipeline (e.g., which table column is used) and instead encodes generic information important to by-target synthesis that is applicable to all pipelines.

Recall that in the problem formulation PMPS, the end goal is to synthesize a pipeline $\hat{L}$ that can produce all FD/Key constraints discovered from the target $T^{tgt}$, while the operators invoked in $\hat{L}$ are plausible with high estimated probabilities. As such, these signals may be directed models such that they are data/pipeline independent.

Figure 5:
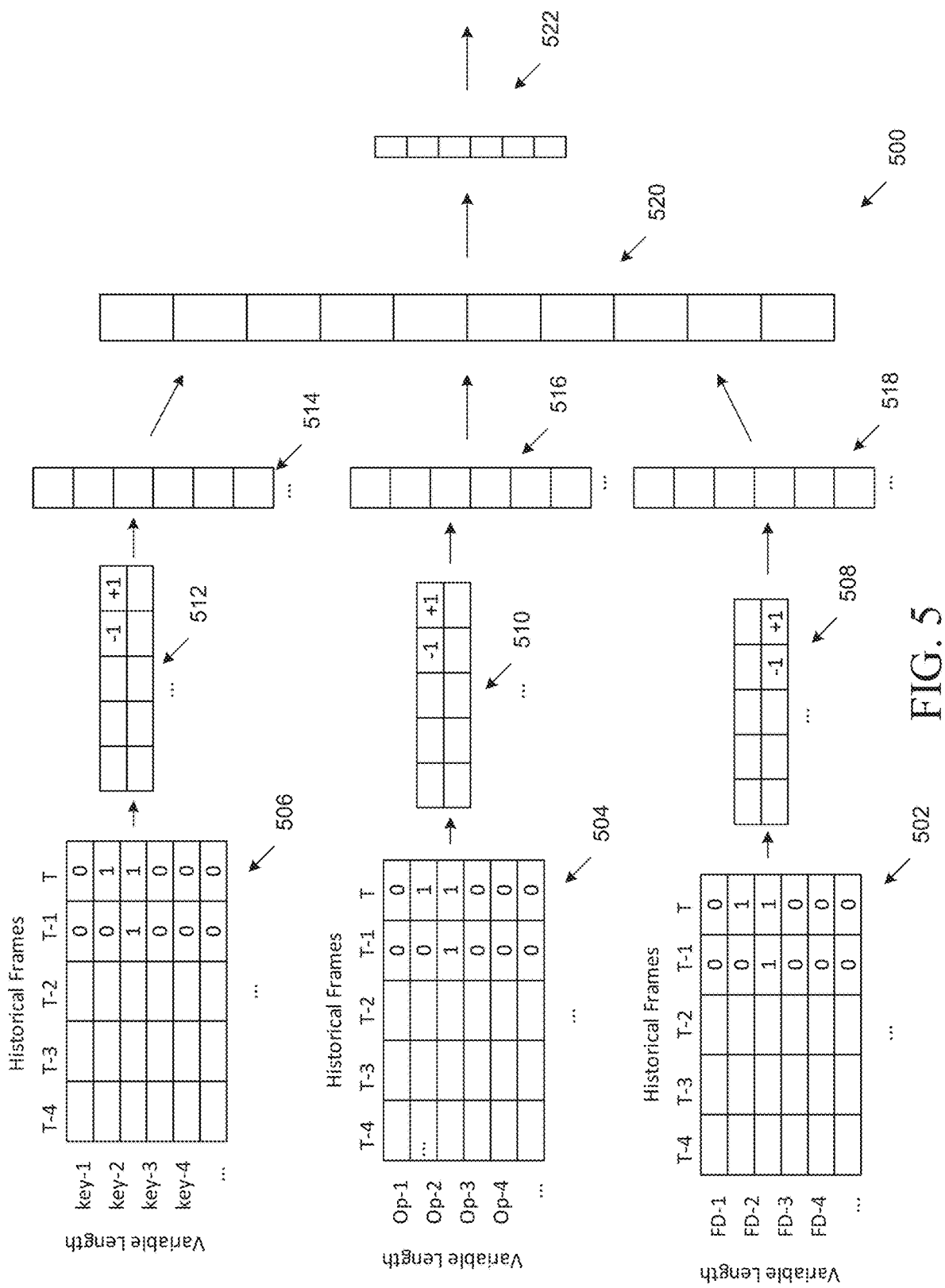
FIG. 5 illustrates an example representation encoding a state of a partial pipeline.

Given a pipeline LT with T pipeline steps/operators, FIG. 5 shows a representation 500 used to encode the state of LT, including FD/Key/operators/column-mapping, etc. It will start with FD representation encoded using the matrix 502 at the lower-left corner (other types of information are encoded similarly and will be described later).

Recall that FDs are discovered from the target table $T^{tgt}$, and the goal is to synthesize pipelines matching all these FDs. The FDs are arranged in $T^{tgt}$ as rows in the matrix 502, and encode the FDs satisfied by $L_T$ using the right-most columns (marked with T), where a "0" entry indicates that this corresponding FD has not been satisfied by $L_T$ yet, while a "1" indicates that FD has been satisfied. Columns to the left correspond to FDs of pipelines from previous timesteps, with T−1, T−2 steps/operators, etc., up to a fixed number of historical frames.

This representation, together with a convolutional architecture, has at least two benefits. First, this matrix 502 explicitly models historical information (i.e., what FDs are satisfied from previous pipelines), so that with convolution filters 508, the model can directly "learn" whether adding an operator at T-th step makes "progress" in satisfying more FDs. As a concrete example, FIG. 5 shows a convolutional filter that may be learned, which has a "−1" and a "+1". This filter allows a check into whether an increased number of FDs are satisfied from time (T−1) to T. In this example, FD-2 is not satisfied at the (T−1) step but is now satisfied at the T step, as marked by the "0" and the "1" in the matrix 502. Applying a dot-product between the matrix and the example convolutional filter 508 yields $(0*(-1)+1*(+1))=1$ on this portion of data, which can be intuitively seen as signaling "positive progress" in covering more FDs from time (T−1) to T. Observe that in comparison, from time (T−1) to T, both FD-1 (with 0/0 before/after) and FD-3 (with 1/1 before/after) get a 0 from applying a dot-product with this filter, indicating no progress for these two FDs.

In typical computer-vision tasks where convolutional architectures are applied, many convolutional filters are stacked together to learn visual features (e.g., circles versus lines). Similar cony-filters are applied in the synthesis problem, which interestingly learns local features like FD-progress instead. Another benefit of this representation and a convolutional architecture is the flexibility in representing pipeline tasks with varying numbers of constraints (e.g., varying numbers of FDs/Keys, etc.) because the user can set the number of rows in the matrix as the maximum number of FDs across all pipelines and conveniently "pad" rows not used for a specific pipeline as "0"s (which leads to 0 regardless of what convolutional filters are applied).

In addition to FD, other types of information (e.g., Key constraints, operator probabilities (Op), column-mapping) can be modeled similarly using the same matrix representation and convolutions filter architecture, as shown in the top part of FIG. 5. For instance, a second matrix 504 for operator probabilities and a corresponding convolutional filter 510 may also (or alternatively) be used. A third matrix 506 for key constraints and a corresponding convolutional filter 512 may also (or alternatively) be used. These representations may then be fed into pooling layers 514, 516, 518 and an MLP layer 520 before being concatenated and passed into additional layers to produce a final function-approximation of Q(s) 522.

Described now is an example approach to train this model to learn the value-function Q(s) 522, using "self-synthesis" of real data pipelines harvested from a repository, such as a GitHub repository. Similar to Auto-Suggest, large numbers of Jupyter notebooks may be crawled on GitHub and "replayed" step-by-step using corresponding input files to re-create real data pipelines, denoted by L. A reinforcement-learning agent is then trained to learn to synthesize L, by using Algorithm 1 but replacing GetPromisingTopK and GetFinalTopK with learned Q(s) (i.e., picking top-K pipelines with the highest Q(s) values).

To start, the Q(s) model was initialized with random weights. In each subsequent episode, a real pipeline $L=\{O_1(p_1), O_2(p_2), \ldots, O_n(p_n)\} \in L$ is sampled to synthesize L using the current Q(s) and Algorithm 1. If successfully synthesized, L is assigned a reward of +1 for all previous states traversed by L in the search graph. That is, for all $i \in [n]$, $Q(s_i)=+1$ is assigned, where $s_i=\{O_1(p_1), \ldots, O_i(p_i)\}$. For all remaining states s' traversed that do not lead to a successful synthesis, $Q(s')=-1$ is assigned. Through the training of the value-function Q(s) from the experience of synthesizing real pipelines, an optimized synthesis policy can be learned quickly that takes into account diverse factors (operator probabilities and various constraints).

Experience replay may be used (for example as described in Long-Ji Lin. 1993. Reinforcement learning for robots using neural networks. Technical Report. Carnegie-Mellon Univ Pittsburgh PA School of Computer Science), in which records all (s,Q(s)) pairs in an internal memory M and "replay" events sampled from M to update the model. This is advantageous because of its data efficiency and the fact that events sampled over many episodes have weak temporal correlations. Q(s) is trained iteratively in experience replay. In each iteration, the Q(s) are used from the previous iteration to play self-synthesis and collect a fixed n number of (s,Q(s)) events into the memory M. Events are randomly sampled in M to update weights of Q(s), and the new Q'(s) may then be used to play the next round of self-synthesis.

In experiments using the present technology, n=500 is used to find the model to converge quickly with 20 iterations. It is also observed that as a clear benefit of using RL over standard supervised-learning ("SL") because in using RL, it is learned from positive/negative examples tailored to the current policy, which tends to be more informative than SL that learns from fixed distributions.

Experiments were performed using the present technology to determined success rates and efficiencies of different pipeline synthesis algorithms. All experiments were performed on a Linux VM from a commercial cloud, with 16 virtual CPUs and 64 GB of memory. Variants of the present technology (referred to as Auto-Pipeline) have been implemented in Python 3.6.9.

Two benchmarks of data pipelines are created to evaluate the task of pipeline synthesis. The first benchmark, referred to as the GitHub benchmark, consists of real data pipelines authored by developers and data scientists harvested at scale from GitHub repositories. Specifically, Jupyter notebooks were crawled from GitHub repositories. They were replayed programmatically on corresponding data sets (from GitHub, Kaggle, and other sources) to reconstruct the pipelines authored by experts in a manner similar to Auto-Suggest. The pipelines were filtered out that are likely duplicates (e.g., copied/forked from other pipelines) and ones that are trivially small (e.g., input tables have less than ten rows). These human-authored pipelines the ground truth for by-target synthesis.

The pipelines are grouped based on pipeline lengths, defined as the number of steps in a pipeline. Longer pipelines are intuitively more difficult to synthesize because the space of possible pipelines grows exponentially with the pipeline length. For the synthesis benchmark, 100 pipelines of length $\{1, 2, 3, 4, 5, [6-8], 9+\}$, for a total of 700 pipelines are randomly sampled.

Since many commercial systems also help users build complex data pipelines (e.g., vendors discussed in Section 1), a second benchmark is created and referred to as the Commercial benchmark, using pipelines from commercial vendors. Four leading vendors were sampled, and 16 demo pipelines were manually collected from official tutorials of these vendors as ground-truth pipelines for synthesis.

Because "by-target" is a new paradigm not studied in the literature before, Auto-Pipeline is compared with methods mostly from the "by-example" literature. The recent "by-example" approach synthesizes SQL queries by input/output tables. SQL-by-example requires users to provide an exact output-table matching the given input tables. In order to make it work for the present comparison, the experiment provided the exact output from the ground truth pipelines to SQL-by-example. In one implementation, a set timeout of 3600 seconds per pipeline is placed. For cases where this method fails due to timeout, another try is given using small input tables with five sampled rows. Because SQL-by-example frequently times-out on large input tables, analyzed is the theoretical upper bound of "coverage," based on the operators it supports in its DSL (Join, Aggregation, Union, etc.). If all operators used in a benchmark pipeline are included in its DSL, the pipeline is marked as "covered" in this theoretical upper-bound analysis.

Results for the present technology (Auto-Pipeline) are reported from three variants: the search-based Auto-Pipeline-Search, the supervised-learning-based Auto-Pipeline-SL, and the reinforcement-learning-based Auto-Pipeline-RL. The evaluation metrics used included an accuracy, a mean reciprocal rank (MRR), and a latency. For accuracy, given a benchmark of P pipelines, accuracy is a measure of the fraction of pipelines that can be successfully synthesized (e.g., num-succ-synthesized/P). MRR is a standard metric that measures the quality of ranking. In the experiment setting, a synthesis algorithm returns a ranked list of K candidate pipelines for each test case, ideally with the correct pipeline ranked high (at top-1). The reciprocal-rank in this case is defined 1/rank, where rank is the rank-position of the first correct pipeline in the candidates (if no correct pipeline is found, then the reciprocal-rank is 0). For a benchmark with P test pipelines, the Mean Reciprocal Rank is the mean reciprocal rank over all pipelines. It is noted that MRR is in the range of [0, 1], with one being perfect (all desired pipelines ranked at top-1).

FIGS. 6A-6B show an overall comparison on the GitHub benchmark and the Commercial benchmark, respectively, measured using accuracy, MRR, and latency. Average latency is reported on successfully synthesized cases only because some baselines would fail to synthesize after searching hours.

As can be seen from the results, the present technology (Auto-Pipeline-based methods) can consistently synthesize 60-70% of pipelines within 10-20 seconds across the two benchmarks, which is substantially more efficient and effective than other methods. While the search-based Auto-Pipeline-Search is already effective, Auto-Pipeline-RL is slightly better in terms of accuracy. The advantage of Auto-Pipeline-RL over Auto-Pipeline-Search is more pronounced in terms of MRR, which is expected as learning-based methods are better at understanding the nuance in fine-grained ranking decisions than a coarse-grained optimization objective in the search-based variant (Equation (1)).

It is noted that because the input/output tables are from real pipelines and are typically large, existing by-example synthesis methods like SQL-by-Example frequently timeout after hours of search because their search methods are exhaustive. It should also be noted that even the theoretical upper-bound coverage of existing by-example methods (based on their DSL) are substantially smaller than Auto-Pipeline, showing the richness of the operators supported in the methods.

Figure 7A:
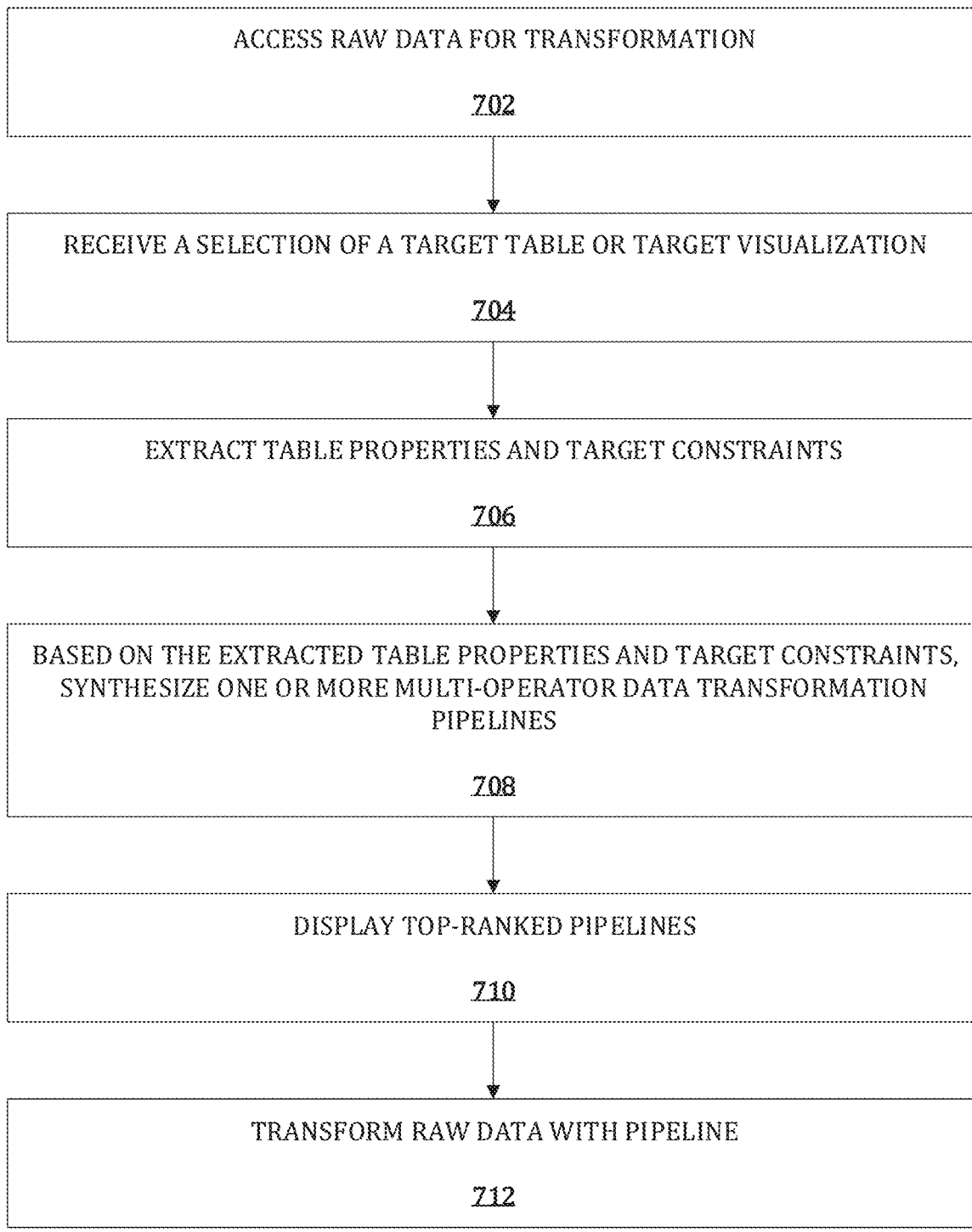
FIG. 7A illustrates an example method for synthesizing one or more pipelines.

FIG. 7A illustrates an example method 700 for synthesizing at least one multi-operator data transformation pipeline. At operation 702, raw data for transformation is accessed and/or received. For example, a client device may send the data to a server device for processing. In other examples, the client device and/or the server device may access data from a database or other data store on the device or accessible by the device. In some examples, the raw data may include multiple input tables that may have different formats.

At operation 704, a selection of a target table or a target visualization may be received. The target table or target visualization is for data other than the raw data. The selection may be received via a variety of methods. For example, a location and/or a copy of the target table and/or visualization may be received. In one example, particular type of a selection (e.g., right-click) on an existing database table or visualization may be detected, and a plurality of menu options may be displayed in response, including options to use the table or visualization as a target. An example option may be "append data to the table" "create a dashboard like this." A selection of the option may be received as the selection of the target table or target visualization.

At operation 706, table properties and target constraints are extracted or determined for the selected target table or visualization. The table properties may include properties such as a schema, and the target constraint may be the types of constraints discussed above, such as key-column constraint and/or a functional-dependency constraint.

At operation 708, based on the table properties and the target constraints extracted in operation 706, one or more multi-operator data transformation pipelines are generated for transforming the raw data to a generated table or generated visualization. The multi-operator data transformation pipelines include at least two data transformation operators. The operators may include, for example, table-reshaping operators and/or string transformation operators. The table-reshaping operators may include at least one of a join operator, a union operator, a groupby operator, an agg operator, a pivot operator, an unpivot operator, or an explode operator. The string transformation operators include at least one of a split operator, a substring operator, a concatenate operator, casing operator, or an index operator. The multi-operator data transformation pipelines may be generated using any of the method and processes discussed above, such as the search-based and/or learning based processes.

At operation 710, the top-ranked pipelines generated in operation 708 may be displayed. While the operation of "displayed" is used herein, it should be understood that a server sending data for a display at a client device may also be considered "displaying." For example, in operation 708 multiple pipelines may be generated, and the top ranked pipelines, such as the top two, may be displayed such that a user may select or inspect the generated pipelines. For example, the generated pipelines may include a first pipeline and a second pipeline. The operators of the first pipeline and the operators of the second pipeline may be displayed and, in some examples, may be displayed concurrently. The operators may be displayed as selectable visual indicators. For example, a Join operator may be displayed as a selectable indicator or icon and a GroupBy operator may be displayed as another selectable indicator or icon. Upon selection of one of the visual indicators representing the operators, the data transformation step of the operator may be displayed. For example, a user may be able to see how the particular operator transforms the raw data accessed in operation 702. Thus, the user can step through the pipeline to understand how each pipeline transforms the data in a step-by-step manner. Based on that review, a user may select (and the system thus receives a selection of) a pipeline for transforming the raw data.

At operation 712, the raw data is transformed with a pipeline generated in operation 708. The pipeline used to transform the data may be the pipeline selected by the user. In other examples, the pipeline may be the top-ranked pipeline (e.g., the pipeline that produces an output table that most closely matches the target table or visualization). The transformation of data may be performed by the same device that synthesized the pipeline or a different device. For example, a server device may synthesize the pipeline, deliver the pipeline to a client device, and the client device may then use the pipeline to transform the raw data to generate an output table or output visualization that matches, or substantially matches, the target table or target visualization.

Figure 7B:
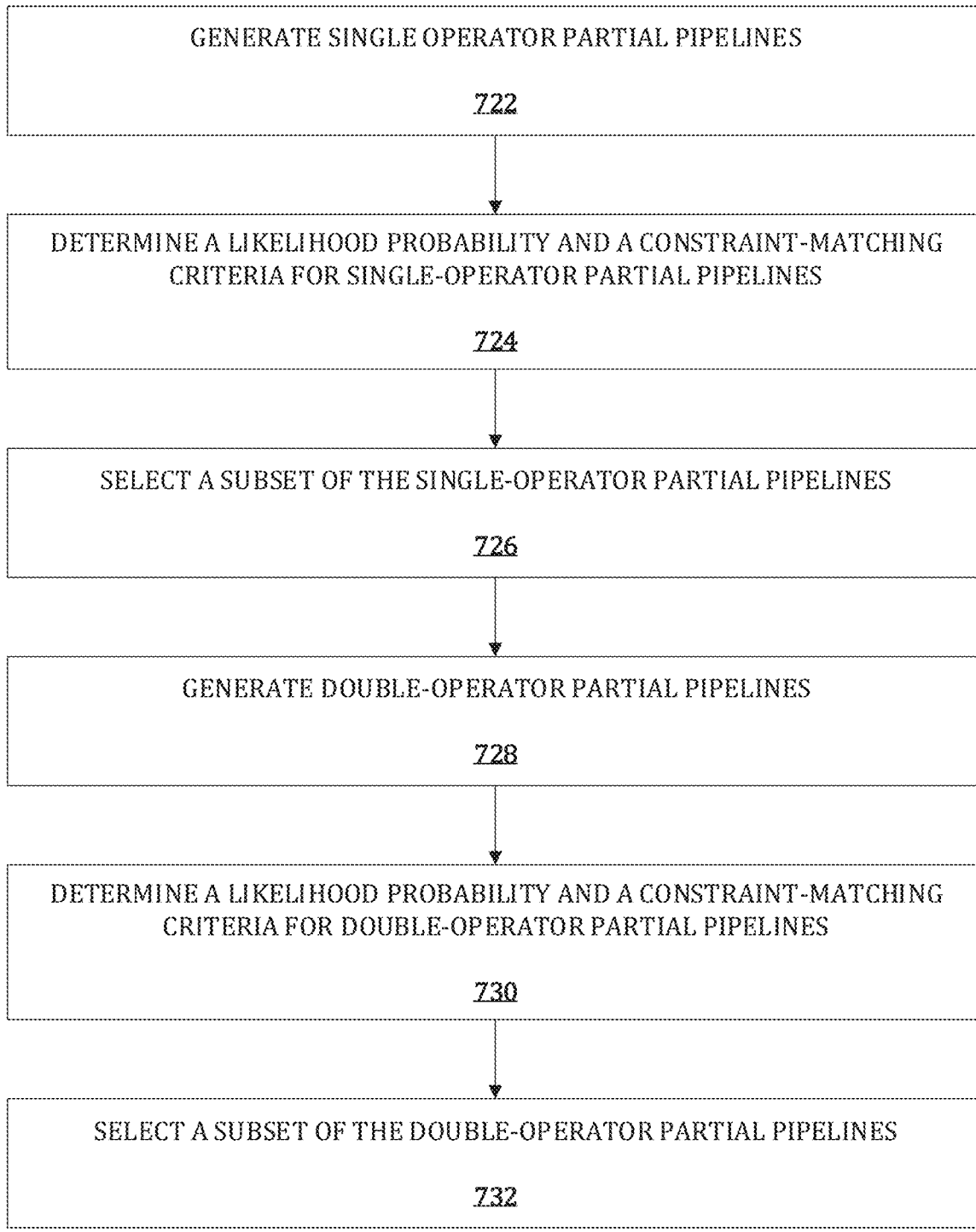
FIG. 7B illustrates another example method for synthesizing one or more pipelines.

FIG. 7B illustrates another example method 720 for synthesizing at least one multi-operator data transformation pipeline. In some examples, the method 720 may be performed as part of operation 708 of method 700 depicted in FIG. 7A. At operation 722, single-operator partial pipelines are generated. The single-operator partial pipelines may correspond to the first depth of nodes in search graph of FIG. 4A. Each of the single-operator partial pipelines include one operator.

At operation 724, for each single-operator partial pipeline generated in operation 722, a likelihood probability and constraint-matching criteria is determined. The likelihood probability may be the operator probability described above and the constraint-matching criteria is based on the target constraints. For example, the constraint-matching criteria may include metrics or data indicating whether an instantiated output table, as produced from the single-operator partial pipeline transforming the raw data, satisfies one or more of the target constraints.

At operation 726, based on the determined likelihood probabilities and constraint matching criteria for the single-operator partial pipelines, a subset of the single-operator partial pipelines may be selected. The subset selected may be the top ranking single-operator partial pipelines. For example, a sub-routine such as GetPromisingTopK( ) may be performed to identify a subset of K single-operator partial pipelines, as discussed above. As also discussed above, machine-learning techniques or models, such as deep reinforcement learning (DRL) model, may also be utilized to identify the subset of single-operator partial pipelines.

At operation 728, double-operator partial pipelines are generated from the subset of the single-operator partial pipelines selected in operation 726. The double-operator partial pipelines may correspond to the second depth of intermediate nodes in the search graph depicted in FIG. 4A. Each of the double-operator partial pipelines include two operators.

At operation 730, for each double-operator partial pipeline generated in operation 728, a likelihood probability and constraint-matching criteria is determined. The likelihood probability may be the operator probability described above and the constraint-matching criteria is based on the target constraints. For example, the constraint-matching criteria may include metrics or data indicating whether an instantiated output table, as produced from the double-operator partial pipeline transforming the raw data, satisfies one or more of the target constraints.

At operation 732, based on the determined likelihood probabilities and constraint matching criteria for the double-operator partial pipelines, a subset of the single-operator partial pipelines may be selected. The subset selected may be the top-ranking double-operator partial pipelines. For example, a sub-routine such as GetPromisingTopK( ) may be performed to identify a subset of K single-operator partial pipelines, as discussed above. As also discussed above, machine-learning techniques or models, such as deep reinforcement learning (DRL) model, may also be utilized to identify the subset of double-operator partial pipelines.

The ultimate synthesized one or more multi-operator data transformation pipelines from operation 708 of method 700 in FIG. 7A are then based on the selected subset of the double-operator pipelines. For example, one or more of the selected double-operator pipelines may be used as the final pipelines. In other examples, additional depths of multi-operator partial pipelines may be generated and evaluated similar to the single-operator and double-operator partial pipelines discussed above.

The final multi-operator data transformation pipelines synthesized in operation 708 may be generated by identifying the top-ranking pipelines. For example, a GetFinalTopK sub-routine or similar process may be performed, as discussed above. As also discussed above, machine-learning techniques or models, such as deep reinforcement learning (DRL) model, may also be utilized to identify the top set of pipelines.

The operations of the methods described above may be performed by components of the systems described above. For example, the operations may be performed by a client device and/or a server device.

Figure 8:
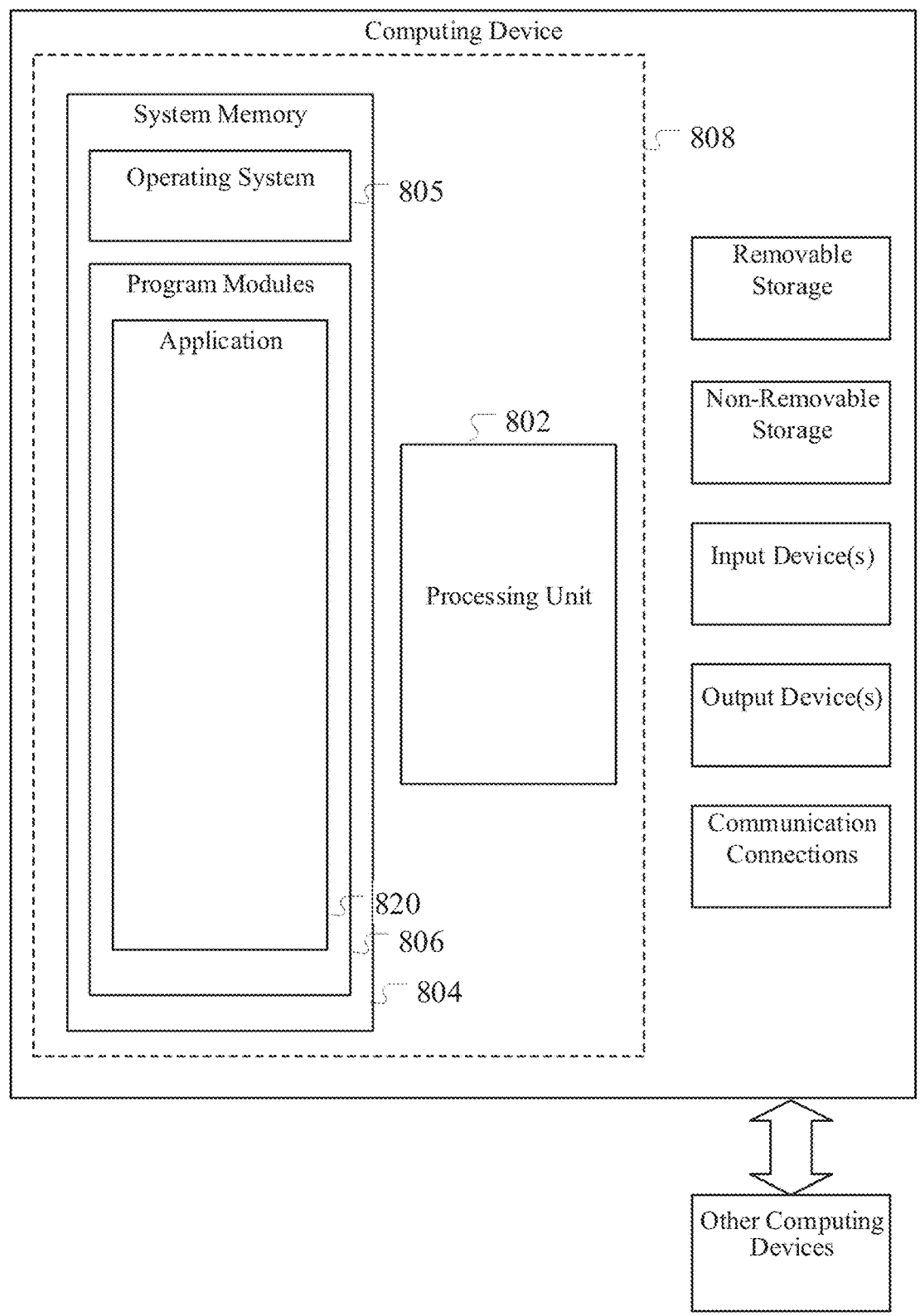
FIG. 8 is a block diagram illustrating example physical components of a computing device with which aspects of the disclosure may be practiced.
Figure 9A:
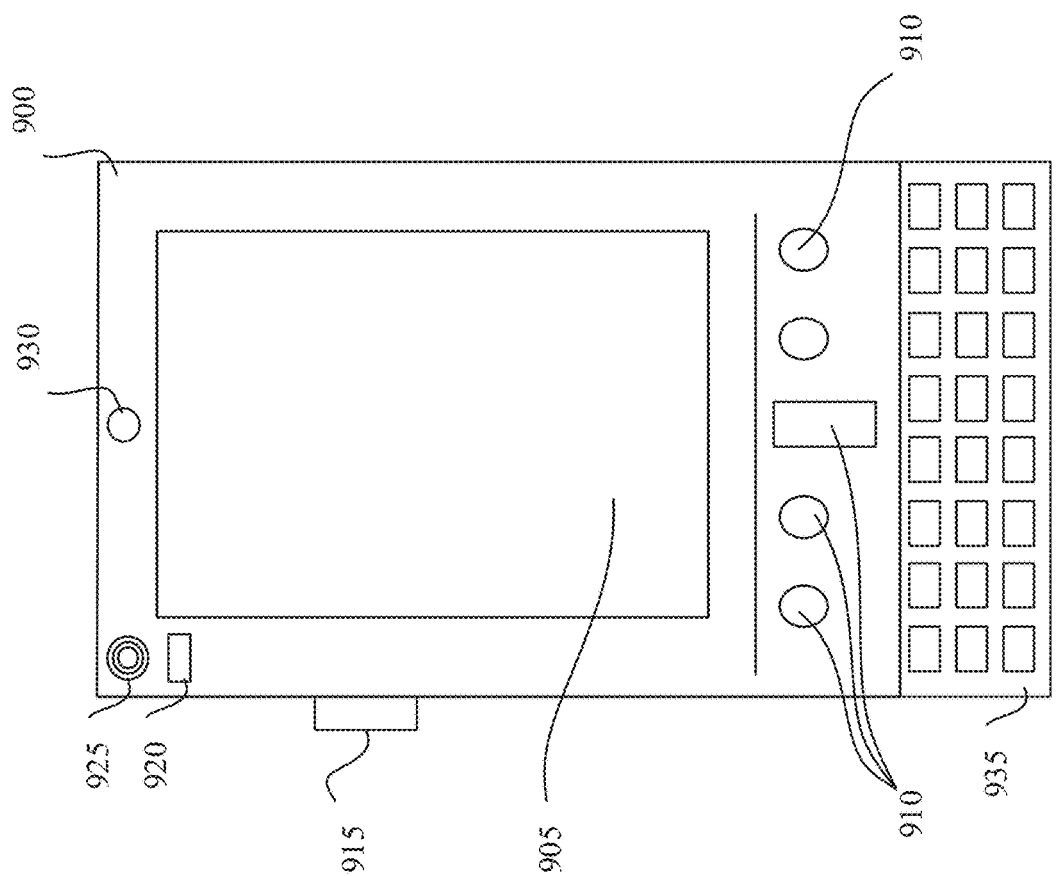
FIGS. 9A and 9B are simplified block diagrams of a mobile computing device with which aspects of the present disclosure may be practiced.
Figure 9B:
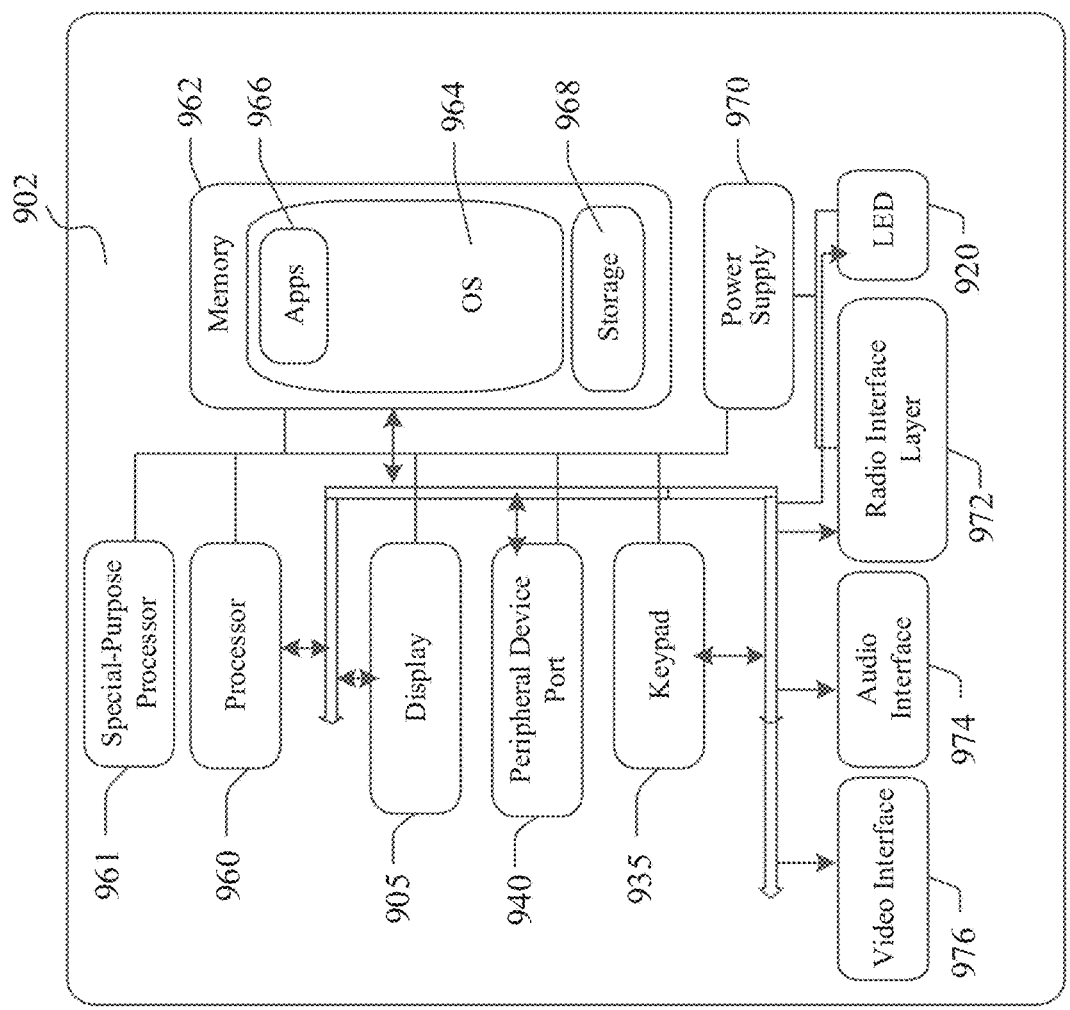

FIGS. 8, 9A, 9B and the associated descriptions provide a discussion of a variety of operating environments in which aspects of the disclosure may be practiced. However, the devices and systems illustrated and discussed with respect to FIGS. 8, 9A, 9B are for purposes of example and illustration and are not limiting a vast number of computing device configurations that may be utilized for practicing aspects of the disclosure described herein.

FIG. 8 is a block diagram illustrating physical components (e.g., hardware) of a computing device 800 with which aspects of the disclosure may be practiced. For example, the computing device 800 may illustrate components of a server device and/or a client device. The computing device components described below may be suitable for the computing devices and systems described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories.

The system memory 804 may include an operating system 805 and one or more program modules 806 suitable for running software application 820, such as one or more virtual machines and/or one or more components supported by the systems described herein. The operating system 805, for example, maybe suitable for controlling the operation of the computing device 800.

Furthermore, embodiments of the disclosure may be practiced in conjunction with a graphics library, other operating systems, or any other application program and are not limited to any particular application or system. This basic configuration is illustrated in FIG. 8 by those components within a dashed line 808. The computing device 800 may have additional features or functionality. The computing device 800 may also include additional data storage devices (removable and/or non-removable) such as, for example, solid-state drives, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects described herein. Other program modules that may be used in accordance with aspects of the present disclosure may include virtual machines, hypervisors, and different types of applications such as electronic mail and contacts applications, word processing applications, spreadsheet applications, database applications, slide presentation applications, drawing or computer-aided application programs, etc.

Furthermore, embodiments, or portions of embodiments, of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units, and various application functionality, all of which are integrated (or "burned") onto the chip substrate as a single integrated circuit. When operating via an SOC, the functionality described herein, with respect to the client's capability to switch protocols, may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As previously discussed, the aspects and functionalities described herein may operate over distributed systems (e.g., such as the system 100 described in FIG. 1), where application functionality, memory, data storage and retrieval and various processing functions may be operated remotely from each other over a distributed computing network, such as the Internet or an intranet. User interfaces and information of various types may be displayed via on-board computing device displays or via remote display units associated with such computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 8A and 8B below include an example computing device associated with client (e.g., a computing device associated with a tenant administrator or other user), for example, that may be utilized to execute a locally installed application associated with the system 106 or run a web browser through which a web application associated with the system 106 is accessible to send requests to the service and/or request status updates, among other functionalities.

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client device may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display).

If included, a side input element 915 allows additional user input. The side input element 915 may be a rotary switch, a button, or any other type of manual input element. Additionally, if included, an on-board camera 930 allows further user input in the form of image data captured using the camera 930. In alternative aspects, mobile computing device 900 may incorporate more or less input elements. For example, the display 905 may not be a touch screen in some embodiments.

In yet another alternative embodiment, the mobile computing device 900 is a portable phone system, such as a cellular phone. The mobile computing device 900 may also include a keypad 935. The keypad 935 may be a physical keypad or a "soft" keypad generated on the touch screen display.

In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device (e.g., a peripheral device). These input and/or output ports are also referred to as peripheral device ports 940 as illustrated in FIG. 9B.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs 966 include phone dialer programs, e-mail programs, personal information management (PIM) programs, word processing programs, spreadsheet programs, Internet browser programs, messaging programs, and so forth. In an aspect, the application programs 966 may also include an application associated with the system 106. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein.

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 described with reference to FIG. 9A may be used to provide visual notifications, and/or an audio interface 974 may be used for producing audible notifications via the audio transducer 925 described with reference to FIG. 9A. These devices may be directly coupled to the power supply 970 so that when activated, they remain on for a duration dictated by the notification mechanism even though the processor(s) (e.g., processor 960 and/or special-purpose processor 961) and other components might shut down for conserving battery power. The visual indicator 920 may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a computing device in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Based on the foregoing, various aspects should be appreciated, including at least the following. In an aspect, the technology relates to a system for generating a multi-operator data transformation pipeline. The system includes at least one processing unit; and system memory encoding instructions that, when executed by the at least one processing unit, cause the system to perform operations. The operations comprise access raw data for transformation; receive a selection of a target table or target visualization, wherein the target table or target visualization is for data other than the raw data; extract table properties and target constraints; and based on the extracted table properties and target constraints, synthesize one or more multi-operator data transformation pipelines for transforming the raw data to a generated table or generated visualization.

In an example, the raw data includes multiple input tables. In another example, the operators in the one or multi-operator data transformation pipelines include at least two or more table-reshaping operators or string transformation operators. In a further example, the table-reshaping operators include at least one of a join operator, a union operator, a groupby operator, an agg operator, a pivot operator, an unpivot operator, or an explode operator; and the string transformation operators include at least one of a split operator, a substring operator, a concatenate operator, casing operator, or an index operator. In yet another example, the target constraints include at least one of a key-column constraint or a functional-dependency constraint. In still another example, the one or more one or more multi-operator data transformation pipelines includes a first multi-operator data transformation pipeline and a second multi-operator data transformation pipeline, and the operations further include concurrently display: the operators of the first multi-operator data transformation pipeline as selectable visual indicators; and the operators of the second multi-operator data transformation pipeline as selectable visual indicators.

In another example, the operations further include generate single-operator partial pipelines; for each single-operator partial pipeline, determine a likelihood probability and a constraint-matching criteria, wherein the constraint-matching criteria is based on the target constraints; based on the determined likelihood probabilities and constraint matching criteria for the single-operator partial pipelines, select a subset of the single-operator partial pipelines; generate, from the subset of the single-operator partial pipelines, double-operator partial pipelines; for each double-operator partial pipeline, determine a likelihood probability and a constraint-matching criteria, wherein the constraint-matching criteria is based on the target constraints; and based on the determined likelihood probabilities and constraint matching criteria for the double-operator partial pipelines, select a subset of the double-operator partial pipelines; wherein the generated one or more multi-operator data transformation pipelines are based on the subset of the double-operator pipelines. In a further example, selecting the subset of single-operator partial pipelines and the subset of double-operator partial pipelines includes using at least one reinforcement learning model.

In another aspect, the technology relates to a method for generating a multi-operator data transformation pipeline. The method includes accessing raw data for transformation; receiving a selection of a target table or target visualization, wherein the target table or target visualization is for data other than the raw data; extracting table properties and target constraints; and based on the extracted table properties and target constraints, synthesizing one or more multi-operator data transformation pipelines for transforming the raw data to a generated table or generated visualization.

In an example, the raw data includes multiple input tables. In another example, the operators in the one or multi-operator data transformation pipelines include at least two or more table-reshaping operators or string transformation operators. In a further example, the table-reshaping operators include at least one of a join operator, a union operator, a groupby operator, an agg operator, a pivot operator, an unpivot operator, or an explode operator; and the string transformation operators include at least one of a split operator, a substring operator, a concatenate operator, casing operator, or an index operator. In still another example, the target constraints include at least one of a key-column constraint or a functional-dependency constraint. In yet another example, the one or more one or more multi-operator data transformation pipelines includes a first multi-operator data transformation pipeline and a second multi-operator data transformation pipeline, and the method further includes concurrently displaying: the operators of the first multi-operator data transformation pipeline as selectable visual indicators; and the operators of the second multi-operator data transformation pipeline as selectable visual indicators.

In another example, the method further includes generating single-operator partial pipelines; for each single-operator partial pipeline, determining a likelihood probability and a constraint-matching criteria, wherein the constraint-matching criteria is based on the target constraints; based on the determined likelihood probabilities and constraint matching criteria for the single-operator partial pipelines, selecting a subset of the single-operator partial pipelines; generating, from the subset of the single-operator partial pipelines, double-operator partial pipelines; for each double-operator partial pipeline, determining a likelihood probability and a constraint-matching criteria, wherein the constraint-matching criteria is based on the target constraints; and based on the determined likelihood probabilities and constraint matching criteria for the double-operator partial pipelines, selecting a subset of the double-operator partial pipelines; wherein the synthesized one or more multi-operator data transformation pipelines are based on the subset of the double-operator pipelines. In a further example, selecting the subset of single-operator partial pipelines and the subset of double-operator partial pipelines includes using at least one reinforcement learning model.

In another aspect, the technology relates to computer storage media storing instructions, that when executed by a processor, causes the processor to perform operations. The operations include accessing raw data for transformation; receiving a selection of a target table or target visualization, wherein the target table or target visualization is for data other than the raw data; extracting table properties and constraints; and based on the extracted table properties and target constraints, synthesizing one or more multi-operator data transformation pipelines for transforming the raw data to a generated table or generated visualization.

In an example, the operators in the one or multi-operator data transformation pipelines include at least two or more table-reshaping operators or string transformation operators; the table-reshaping operators include at least one of a join operator, a union operator, a groupby operator, an agg operator, a pivot operator, an unpivot operator, or an explode operator; and the string transformation operators include at least one of a split operator, a substring operator, a concatenate operator, casing operator, or an index operator. In another example, the target constraints include at least one of a key-column constraint or a functional-dependency constraint. In a further example, selecting the subset of single-operator partial pipelines and the subset of double-operator partial pipelines includes using at least one reinforcement learning model.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A computing device, comprising:
   at least one processing unit; and
   system memory encoding instructions that, when executed by the at least one processing unit, cause the computing device to perform operations comprising:
   receive raw data for transformation;
   provide a user interface for receiving a selection of a target database table or target visualization dashboard;
   receive, by way of the user interface, a selection of the target database table or the target visualization dashboard, wherein the target database table or target visualization dashboard is for data other than the raw data;
extract table properties and target constraints from the selected target database table or target visualization dashboard;
based on the table properties and target constraints extracted from the selected target database table or target visualization dashboard, generate a plurality of multi-operator data transformation pipelines;
receive a selection of one of the plurality of multi-operator data transformation pipelines; and
responsive to receiving the selection, transform the raw data to a generated database table or generated visualization dashboard having a format matching the selected target database table or target visualization dashboard using the selected one of the plurality of multi-operator data transformation pipelines.

2. The system of claim 1, wherein the raw data includes multiple input tables.

3. The system of claim 1, wherein operators in the plurality of multi-operator data transformation pipelines include at least two or more table-reshaping operators or string transformation operators.

4. The system of claim 3, wherein:
the table-reshaping operators include at least one of a join operator, a union operator, a groupby operator, an agg operator, a pivot operator, an unpivot operator, or an explode operator; and
the string transformation operators include at least one of a split operator, a substring operator, a concatenate operator, casing operator, or an index operator.

5. The system of claim 1, wherein the target constraints include at least one of a key-column constraint or a functional-dependency constraint.

6. The system of claim 1, wherein the plurality of multi-operator data transformation pipelines includes a first multi-operator data transformation pipeline and a second multi-operator data transformation pipeline, and wherein the operations further comprise:
concurrently display:
operators of the first multi-operator data transformation pipeline as selectable visual indicators; and
operators of the second multi-operator data transformation pipeline as selectable visual indicators.

7. The system of claim 1, wherein the operations further comprise:
generate single-operator partial pipelines;
for each single-operator partial pipeline, determine a likelihood probability and a constraint-matching criteria, wherein the constraint-matching criteria is based on the target constraints;
based on the determined likelihood probabilities and constraint matching criteria for the single-operator partial pipelines, select a subset of the single-operator partial pipelines;
generate, from the subset of the single-operator partial pipelines, double-operator partial pipelines;
for each double-operator partial pipeline, determine a likelihood probability and a constraint-matching criteria, wherein the constraint-matching criteria is based on the target constraints; and
based on the determined likelihood probabilities and constraint matching criteria for the double-operator partial pipelines, select a subset of the double-operator partial pipelines;
wherein the plurality of multi-operator data transformation pipelines are based on the subset of the double-operator pipelines.

8. The system of claim 7, wherein selecting the subset of single-operator partial pipelines and the subset of double-operator partial pipelines includes using at least one reinforcement learning model.

9. A method for generating a multi-operator data transformation pipeline, the method comprising:
accessing raw data for transformation;
providing a user interface for receiving a selection of a target database table or a target visualization dashboard;
receiving a selection of the target database table or target visualization dashboard by way of the user interface, wherein the target database table or target visualization dashboard is for data other than the raw data;
extracting table properties and target constraints from the selected target database table or target visualization dashboard;
based on the table properties and target constraints extracted from the selected target database table or target visualization dashboard, generating a plurality of multi-operator data transformation pipelines for transforming the raw data to a generated database table or generated visualization dashboard matching the selected target database table or target visualization dashboard;
receiving a selection of one of the plurality of multi-operator data transformation pipelines; and
responsive to receiving the selection, transforming the raw data to the generated database table or generated visualization dashboard having a format matching the selected target database table or target visualization dashboard using the selected one of the plurality of multi-operator data transformation pipelines.

10. The method of claim 9, wherein the raw data includes multiple input tables.

11. The method of claim 9, wherein operators in the plurality of one or multi-operator data transformation pipelines include at least two or more table-reshaping operators or string transformation operators.

12. The method of claim 11, wherein:
the table-reshaping operators include at least one of a join operator, a union operator, a groupby operator, an agg operator, a pivot operator, an unpivot operator, or an explode operator; and
the string transformation operators include at least one of a split operator, a substring operator, a concatenate operator, casing operator, or an index operator.

13. The method of claim 9, wherein the target constraints include at least one of a key-column constraint or a functional-dependency constraint.

14. The method of claim 9, wherein the multi-operator data transformation pipelines includes a first multi-operator data transformation pipeline and a second multi-operator data transformation pipeline, and wherein the method further comprises:
concurrently displaying:
operators of the first multi-operator data transformation pipeline as selectable visual indicators; and
operators of the second multi-operator data transformation pipeline as selectable visual indicators.

15. The method of claim 9, further comprising:
generating single-operator partial pipelines;
for each single-operator partial pipeline, determining a likelihood probability and a constraint-matching criteria, wherein the constraint-matching criteria is based on the target constraints;
based on the determined likelihood probabilities and constraint matching criteria for the single-operator partial pipelines, selecting a subset of the single-operator partial pipelines;
generating, from the subset of the single-operator partial pipelines, double-operator partial pipelines;
for each double-operator partial pipeline, determining a likelihood probability and a constraint-matching criteria, wherein the constraint-matching criteria is based on the target constraints; and
based on the determined likelihood probabilities and constraint matching criteria for the double-operator partial pipelines, selecting a subset of the double-operator partial pipelines;
wherein the plurality of multi-operator data transformation pipelines are based on the subset of the double-operator pipelines.

16. The method of claim 15, wherein selecting the subset of single-operator partial pipelines and the subset of double-operator partial pipelines includes using at least one reinforcement learning model.

17. Computer storage media storing instructions that cause one or more processors to perform operations comprising:
receiving raw data for transformation;
providing a user interface for receiving a selection of a target database table or target visualization dashboard;
receiving a selection of a target database table or target visualization dashboard by way of the user interface, wherein the target database table or target visualization dashboard is for data other than the raw data;
extracting table properties and target constraints from the selected target database table or target visualization dashboard;
based on the table properties and target constraints extracted from the selected target database table or target visualization dashboard, generating a plurality of one or more multi-operator data transformation pipelines for transforming the raw data to a generated database table or generated visualization dashboard matching the selected target table or target visualization;
receiving a selection of one of the plurality of multi-operator data transformation pipelines; and
responsive to receiving the selection, transforming the raw data to a generated database table or generated visualization dashboard having a format matching the selected target database table or target visualization dashboard using the selected one of the plurality of multi-operator data transformation pipelines.

18. The computer storage media storing instructions of claim 17, wherein:
operators in the plurality of multi-operator data transformation pipelines include at least two or more table-reshaping operators or string transformation operators;
the table-reshaping operators include at least one of a join operator, a union operator, a groupby operator, an agg operator, a pivot operator, an unpivot operator, or an explode operator; and
the string transformation operators include at least one of a split operator, a substring operator, a concatenate operator, casing operator, or an index operator.

19. The computer storage media of claim 17, wherein the target constraints include at least one of a key-column constraint or a functional-dependency constraint.

20. The computer storage media of claim 17, having further instructions stored thereupon that cause the one or more processors to perform operations comprising:
generating single-operator partial pipelines;
for each single-operator partial pipeline, determining a likelihood probability and a constraint-matching criteria, wherein the constraint-matching criteria is based on the target constraints;
based on the determined likelihood probabilities and constraint matching criteria for the single-operator partial pipelines, selecting a subset of the single-operator partial pipelines;
generating, from the subset of the single-operator partial pipelines, double-operator partial pipelines;
for each double-operator partial pipeline, determining a likelihood probability and a constraint-matching criteria, wherein the constraint-matching criteria is based on the target constraints; and
based on the determined likelihood probabilities and constraint matching criteria for the double-operator partial pipelines, selecting a subset of the double-operator partial pipelines;
wherein the plurality of multi-operator data transformation pipelines are based on the subset of the double-operator pipelines; and wherein the subset of single-operator partial pipelines and the subset of double-operator partial pipelines are selected using at least one reinforcement learning model.

* * * * *